United States Patent
Yonezawa et al.

(10) Patent No.: US 7,187,402 B2
(45) Date of Patent: Mar. 6, 2007

(54) COMMUNICATION APPARATUS, IMAGE PROCESSING APPARATUS, COMMUNICATION METHOD, AND IMAGE PROCESSING METHOD

(75) Inventors: Hiroki Yonezawa, Tokyo (JP); Tomoaki Kawai, Yokohama (JP); Masaaki Kotani, Yokohama (JP); Kazuko Tsujimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 10/386,761

(22) Filed: Mar. 12, 2003

(65) Prior Publication Data
US 2003/0184647 A1  Oct. 2, 2003

Related U.S. Application Data

(60) Continuation of application No. 09/867,355, filed on May 29, 2001, now Pat. No. 6,580,451, which is a division of application No. 08/768,653, filed on Dec. 18, 1996, now Pat. No. 6,266,082.

(30) Foreign Application Priority Data

| Dec. 19, 1995 | (JP) | ................................. 7-330869 |
| Jan. 30, 1996 | (JP) | ................................. 8-014182 |
| Apr. 22, 1996 | (JP) | ................................. 8-100206 |

(51) Int. Cl.
*H04N 7/18* (2006.01)
(52) U.S. Cl. .................................... 348/159
(58) Field of Classification Search ............... 348/159, 348/211.1–211.14, 150, 153, 14.01, 14.03, 348/14.08, 14.12, 36; 345/2.1, 4, 156, 163
See application file for complete search history.

(56) References Cited

U.S. PATENT DOCUMENTS 5,657,246 A * 8/1997 Hogan et al. ............... 348/14.1

(Continued)

FOREIGN PATENT DOCUMENTS

EP  0 490 624 A2  6/1992

(Continued)

OTHER PUBLICATIONS

Abstract, JP 07 087469, Mar. 31, 1995, Oiwa Yasuyuki, "Digital Tablet for Video Conference".

(Continued)

*Primary Examiner*—Tung Vo
(74) *Attorney, Agent, or Firm*—Morgan & Finnegan, L.L.P.

(57) ABSTRACT

In order to freely select, locate and display an image from a remote place on a monitor to facilitate observer's use, disclosed are apparatus and methods arranged to perform operation of drag and drop of a symbol to a specific position on a map showing the symbol indicating information of the position where an image generator is set, thereby establishing logical network connection with a video transmission terminal to which the image generator is connected, to display a video in an arbitrary display area, to perform the drag and drop operation of the video displayed in the video display area to another video display area, thereby changing a video display position, and to perform the drag and drop operation thereof to a display stop symbol, thereby disconnecting the logical network connection to stop the video display of the video camera.

12 Claims, 33 Drawing Sheets

U.S. PATENT DOCUMENTS

| | | | |
|---|---|---|---|
| 5,872,922 A * | 2/1999 | Hogan et al. | 709/204 |
| 6,002,995 A * | 12/1999 | Suzuki et al. | 702/188 |
| 6,191,807 B1 * | 2/2001 | Hamada et al. | 348/14.07 |
| 6,396,480 B1 * | 5/2002 | Schindler et al. | 345/169 |
| 6,580,451 B2 * | 6/2003 | Yonezawa et al. | 348/159 |
| 6,646,673 B2 * | 11/2003 | Caviedes et al. | 348/14.07 |
| 6,680,746 B2 * | 1/2004 | Kawai et al. | 348/211.9 |
| 6,720,987 B2 * | 4/2004 | Koyanagi et al. | 348/36 |
| 2003/0184647 A1 * | 10/2003 | Yonezawa et al. | 348/143 |

FOREIGN PATENT DOCUMENTS

| | | |
|---|---|---|
| EP | 0 513 601 A1 | 11/1992 |
| EP | 0 622 730 A2 | 11/1994 |

OTHER PUBLICATIONS

Abstract, JP 07 322225, Aug. 12, 1995, Hamada Noburu, "Video Telephone Set and File Transfer Method in Video Telephone Set".

* cited by examiner

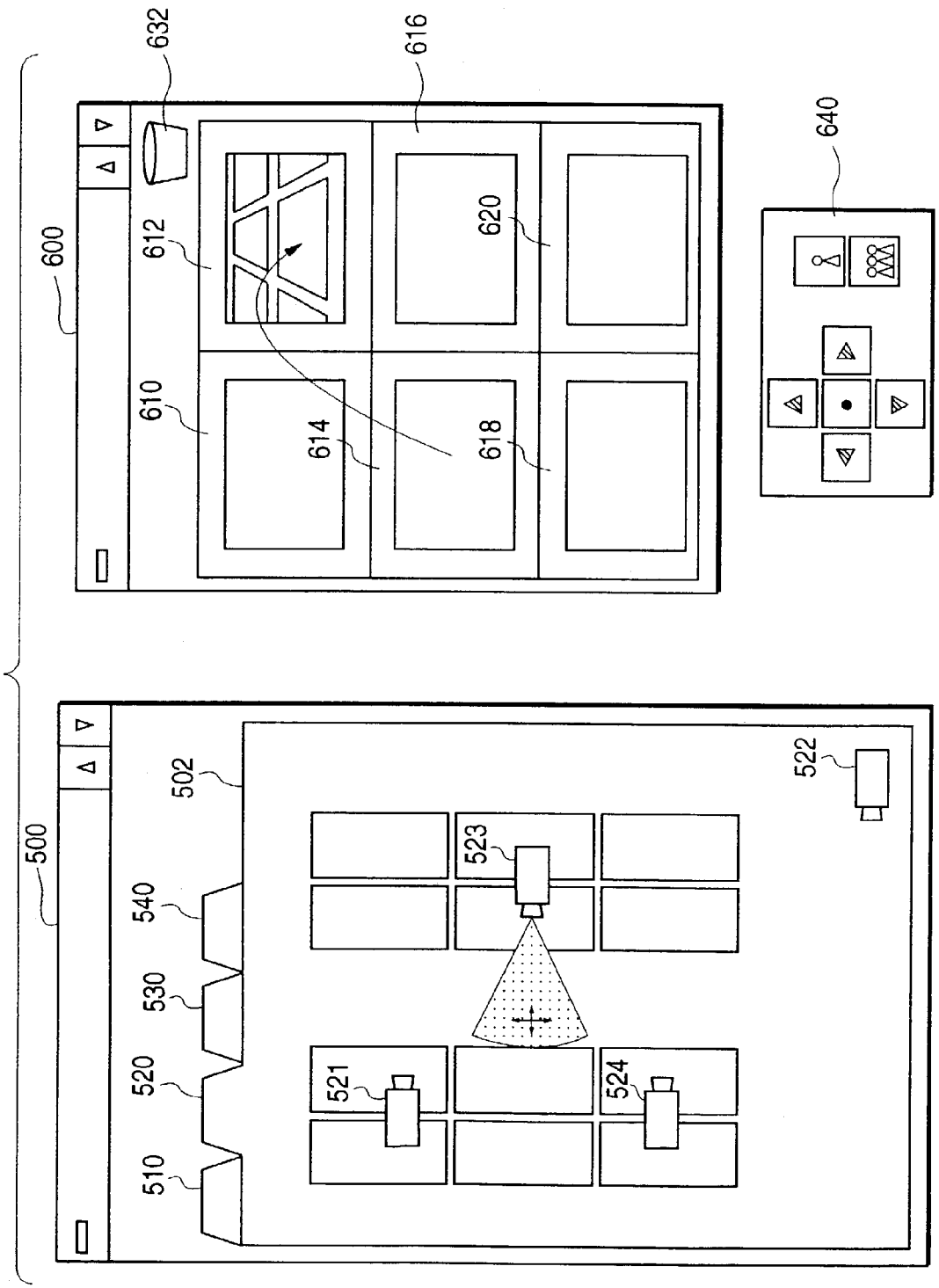

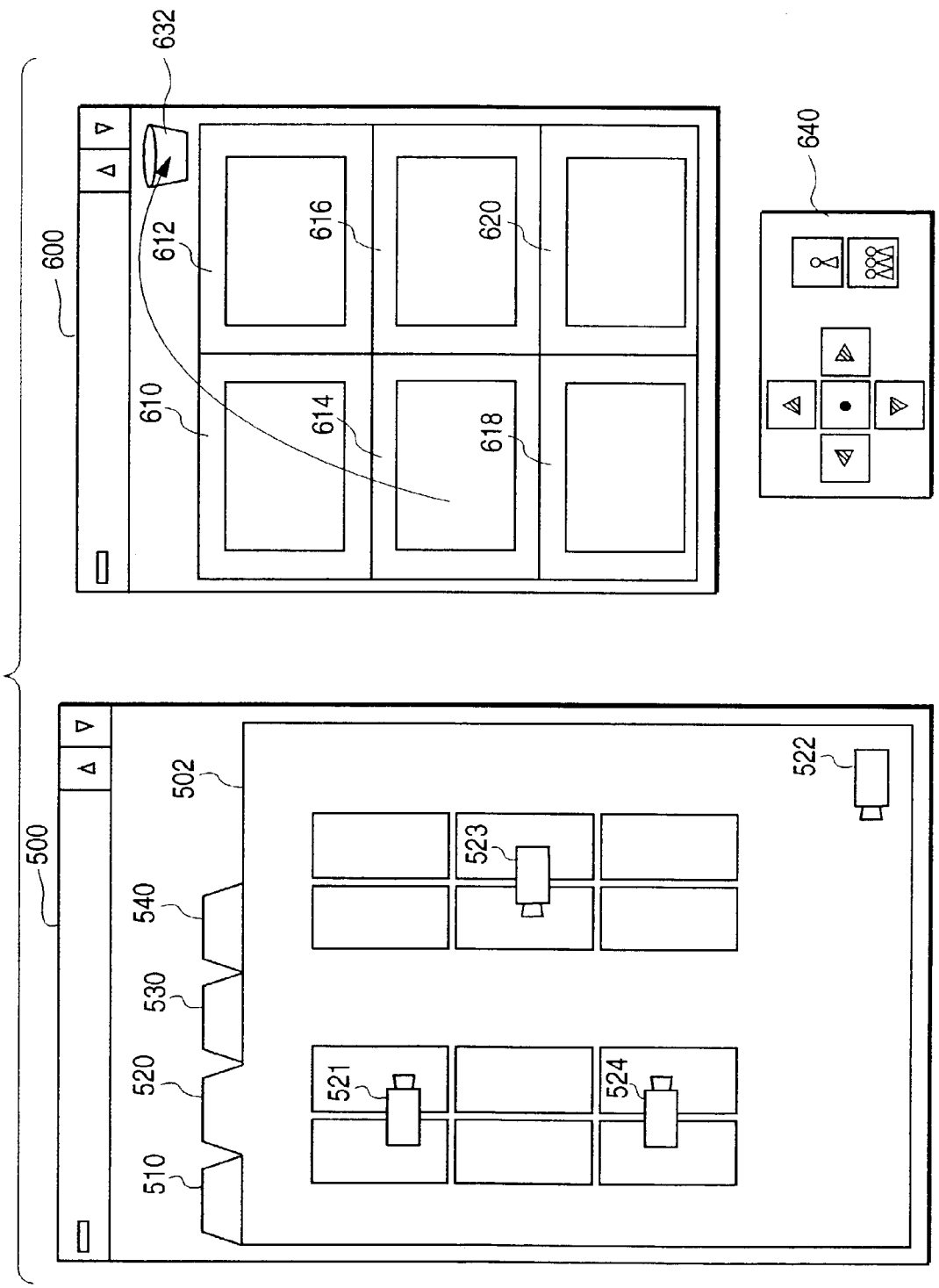

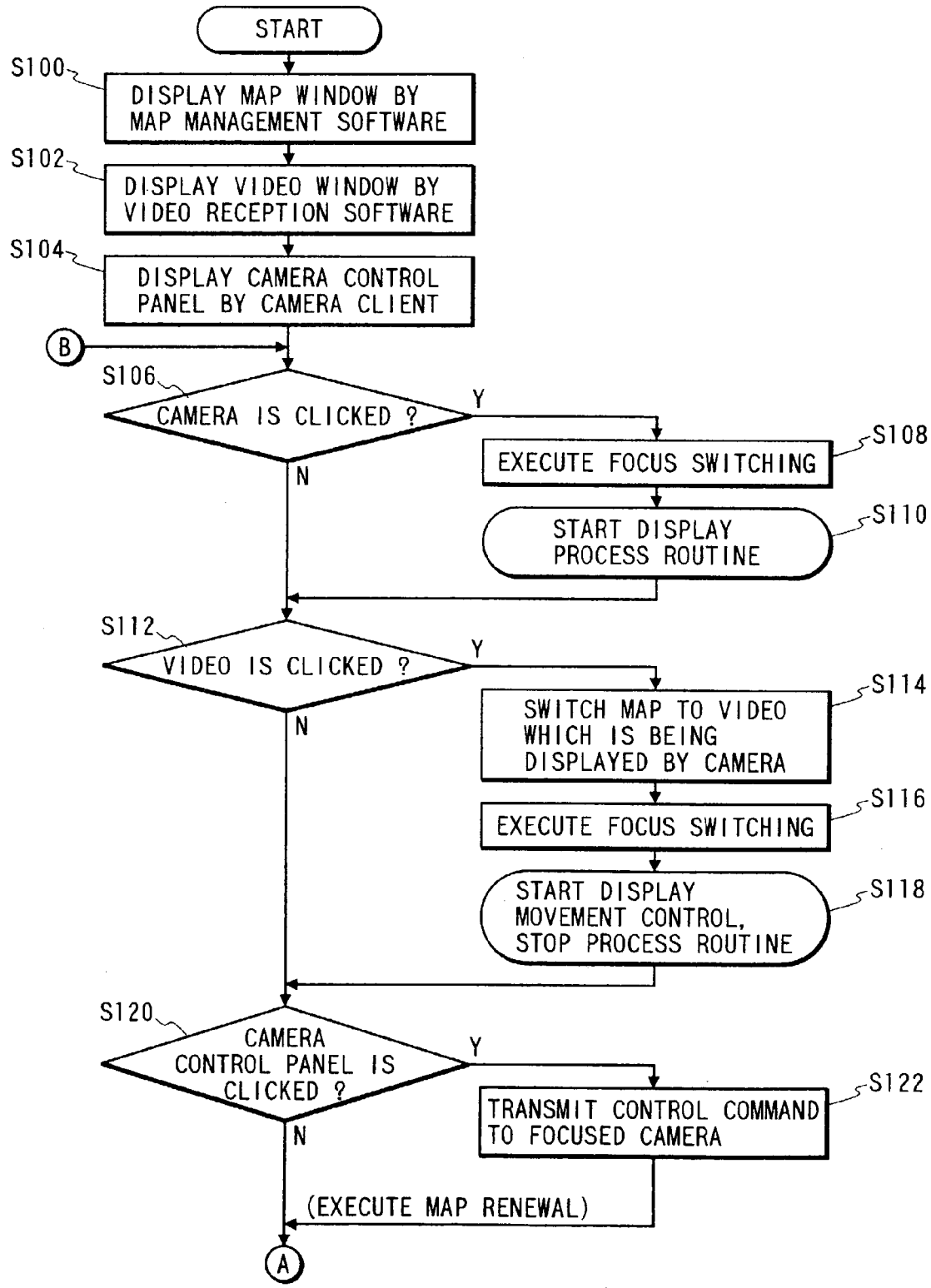

MAP MANAGEMENT SOFTWARE
(THIRD EMBODIMENT)

CAMERA CONTROL CLIENT
(THIRD EMBODIMENT)

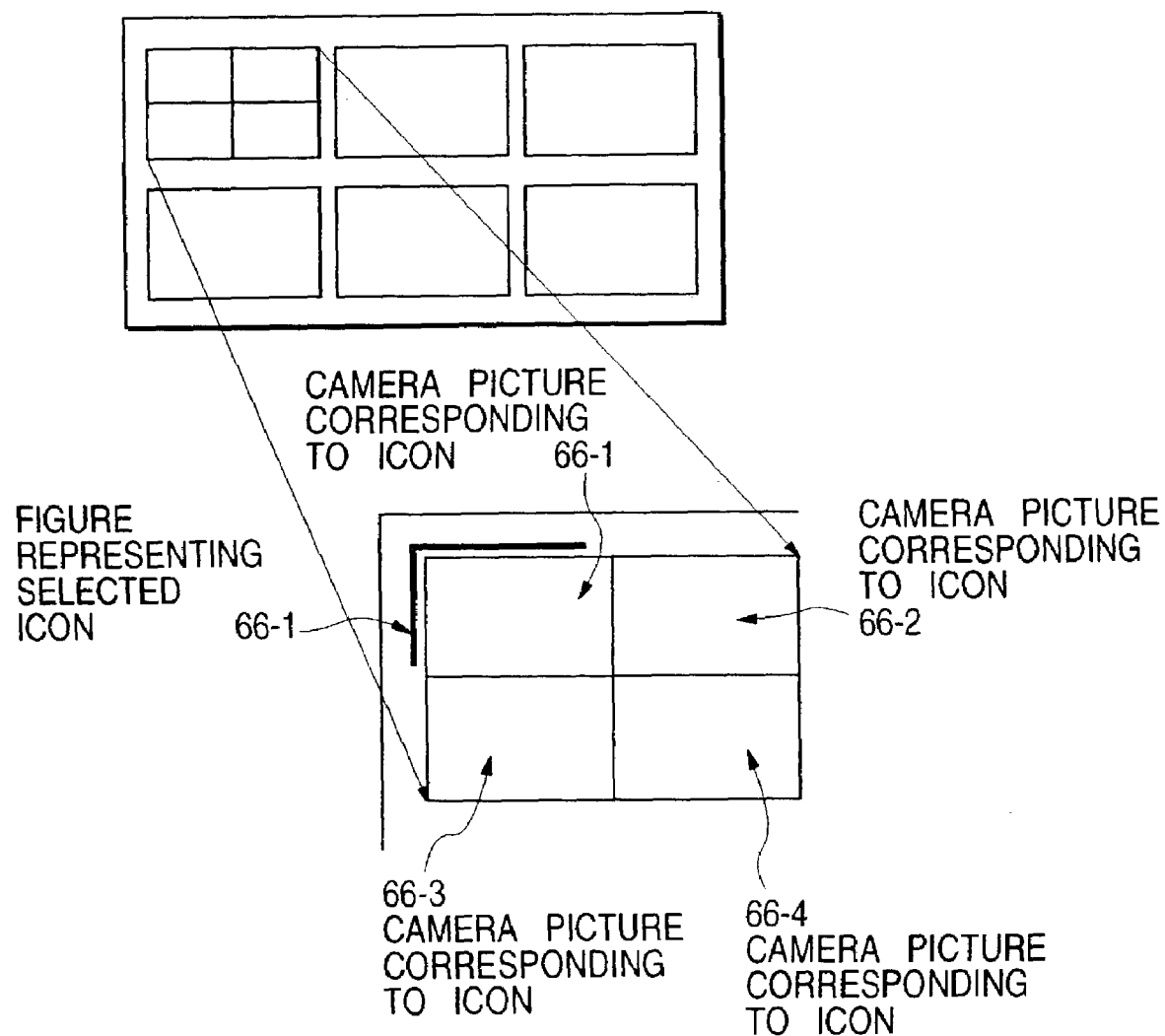

COMMUNICATION APPARATUS, IMAGE PROCESSING APPARATUS, COMMUNICATION METHOD, AND IMAGE PROCESSING METHOD

This is a continuation application of application Ser. No. 09/867,355, filed May 29, 2001 now U.S. Pat No. 6,580,451, which is a divisional application of Ser. No. 08/768,653, filed Dec. 18, 1996 now U.S. Pat. No. 6,266,082. The entirety of both of the applications is incorporated by reference herein.

BACKGROUND OF THE INVENTION

1. Field of the Invention

The present invention relates to a communication apparatus and method and to an image processing apparatus and method.

2. Related Background Art

A monitoring apparatus as an example of such communication apparatus is composed of several video cameras, a composer for performing analog synthesis of videos therefrom, and a device called a switcher for enabling selection thereof. Such apparatus are mainly used in relatively small buildings and are called local monitoring systems. In contrast with the local monitoring systems, recently being developed are remote monitoring systems which use a digital network such as LAN or ISDN instead of analog cables as video transmission lines, thereby permitting substantial extension of transmission lines.

Camera control systems permitting remote control of one or plural monitoring cameras from a remote place are well known. Each monitoring camera is one fixed on a stage as being always directed in one direction or one permitting external control of pan, tilt, and zoom. The latter camera usually incorporates a function to remotely control the taking direction and magnification from a monitoring center.

When a plurality of cameras are remotely controlled, it is necessary to indicate locations and orientations of the respective cameras for an operator. For example, proposed as a monitoring system with many cameras set in a shop, a plant, or a building arranged to remotely control them is a camera information display system for displaying graphics (camera icons) indicating the cameras at positions corresponding to the setting positions of the respective cameras.

Among the recent monitoring systems there are some reported systems utilizing an IBM PC compatible (PC) as a monitoring terminal and realizing video display and system control with Graphical User Interface (GUI). Use of GUI with a computer as a monitoring apparatus presents an advantage of ease to handle even for people unaccustomed to the apparatus.

However, the conventional systems of this type use the digital network as video transmission lines, but show analog display on the monitor. Thus, the display positions of video camera images strongly depend upon the hardware of system. Therefore, since the display positions of video camera images are fixedly assigned to a video display section on a specific monitoring terminal upon introduction of system, an observer being a user cannot freely rearrange the video display position in order to make them easier to handle or cannot select the video camera images which are merely displayed.

SUMMARY OF THE INVENTION

An object of the present invention is to provide a communication apparatus and method easy to use, taking account of the foregoing points.

Another object of the present invention is to realize easy line connection with a desired terminal.

A further object of the present invention is to realize easy-to-view observation of received images from image generating apparatus.

A preferred embodiment of the present invention discloses an arrangement in which upon displaying received image data from an image transmitting terminal on a monitor, network connection with the foregoing terminal is performed based on a display instruction on the monitor as to the received image data from the terminal.

Further disclosed is an image processing apparatus having means for supplying a video signal to a monitor to display a map indicating a setting condition of image pickup means, means for displaying a symbol indicating a location of the foregoing image pickup means on the map, and control means for displaying an image signal from the image pickup means on the monitor in accordance with drag and drop of the symbol on the map.

Other objects and features of the present invention will be apparent from the following description and the attached drawings.

BRIEF DESCRIPTION OF THE DRAWINGS

FIG. 8 is a drawing to show the state upon change of video display area by D & D operation.

FIG. 10 is a drawing to show the state upon execution of video display stop by D & D operation.

FIG. 11 is a flowchart to show the operation of the entire apparatus of the present embodiment.

FIG. 41 is a partially enlarged view to show part of the composite image shown in FIG. 40.

DESCRIPTION OF THE PREFERRED EMBODIMENTS (Embodiment 1)

Embodiment 1 of the present invention will be described in detail with reference to the drawings.

Figure 1:
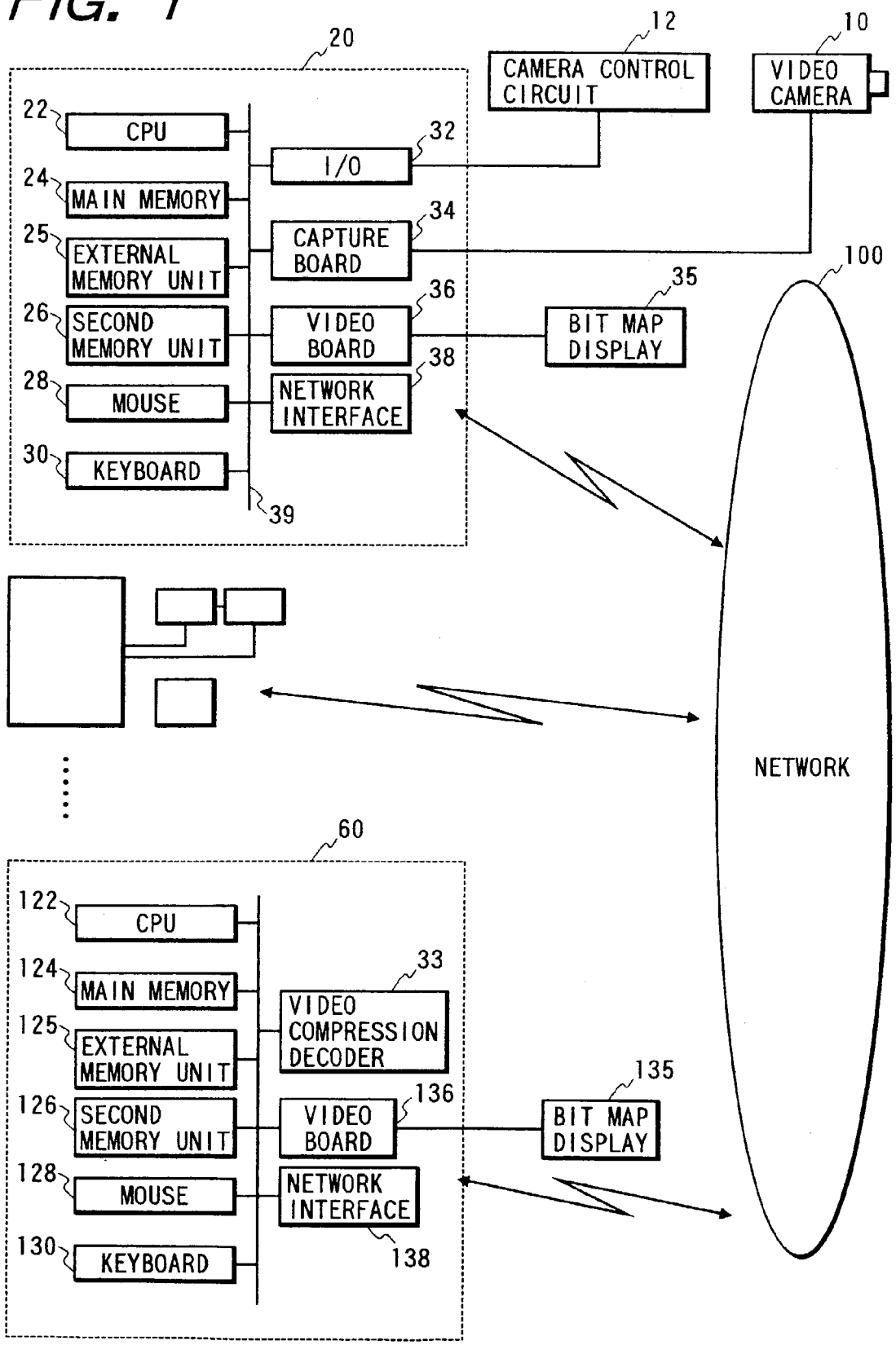
FIG. 1 is a block diagram of video transmitting terminal and monitoring terminal in an embodiment of the present invention.

FIG. 1 is a block diagram of the whole system including video transmitting terminals and a monitoring terminal.

A video transmitting terminal 20 shown in FIG. 1 is used together with a video camera as an example of image signal generating apparatus, and the terminal receives a control signal of video camera from the monitoring terminal as being a video receiving terminal, actually controls the video camera, and performs A/D conversion and data compression of video signals from the video camera to transmit obtained data to the network.

In FIG. 1, reference numeral 10 designates a video camera, and 12 a camera control circuit for directly controlling pan, tilt, zoom, focusing, aperture, and so on of the video camera 10 in accordance with an external control signal. The external control signal is input from an interface provided by RS-232C, for example.

The camera control circuit 12 does not always have to be provided in the case of the video camera 10 incapable of controlling pan, tilt, etc., but the control circuit 12 may be arranged to perform on/off control of power supply of video camera 10. Numeral 20 denotes a computer for controlling the video camera 10 connected to the camera control circuit 12 by sending a control code to the camera control circuit 12 and for transmitting video data obtained from the video camera 10 through a network interface 38 to the network. For example, it is conceivably a work station (WS) or a personal computer (PC).

Next described is the configuration of the computer 20 in the present embodiment. Numeral 22 represents a CPU for controlling the entire system, 24 a main memory, 26 a secondary memory unit such as a hard disc unit, and 28 a mouse as a designating device, which, without having to be limited to the mouse, may be another device in the present invention, for example, a touch panel on a display 35. Numeral 30 is a keyboard. Numeral 25 denotes a removable external memory unit such as a floppy disc or a CDROM, and the software of this system may be read out of these media or the network interface 38 to be stored in the secondary memory unit 26. Numeral 32 is an I/O board connected to the camera control circuit 12 for transmitting and receiving the camera control signal, and 34 a video capture board for capturing a video output signal VD from the video camera 10. The video output signal may be either analog as in NTSC or digital, but in the analog case possession of a function to perform A/D conversion is required. The video capture board 34 does not have to include a data compression function, but without the compression function, execution of software compression is rather desired. The captured video is output from the board 34 through a bus 39 to the video board 36 to be displayed at an arbitrary position on the bit map display 35. Such control of display position is carried out when the CPU 22 gives an instruction of display position and position or area to the video board 36. Numeral 39 is a system bus for connecting the devices of from CPU 22 to network interface 38 with each other.

The above configuration permits the terminal 20 to transmit a video via the network 100 to the monitoring terminal at a remote place, to receive the camera control signal from the monitoring terminal, and to perform the camera control.

Numeral 60 indicates the schematic configuration of the monitoring terminal (video receiving terminal). The monitoring terminal 60 sends a control signal for video camera 10 to the video transmitting terminal 20, and the video transmitting terminal 20 controls the video camera in accordance with such a control signal and sends the status of video camera 10 obtained as a result back to the monitoring terminal 60. The monitoring terminal 60 displays the status of the pertinent video camera on a display unit, for example, on a bit map display 135. Further, the monitoring terminal 60 receives video data sent from the video transmitting terminal 20, expands the compressed data by software, i.e., decodes the coded data, and displays the thus decoded data on the display unit in real time. As seen from the drawing, the monitoring terminal 60 has the same configuration as that attained by excluding the video camera 10, camera control unit 12, and capture board 34 from the video transmitting terminal 20, and elements having the same functions as those in the terminal 20 are denoted by reference numerals with addition of "100" to those in the terminal 20. Of course, they do not necessarily have to be excluded in particular. If expansion of compressed data takes too much time because of insufficient performance of CPU 122, extended hardware with a compression-expanding function may be added.

The above configuration permits the terminal 60 to receive the video from the video transmitting terminal 20 at a remote place via the network 100, to perform expansion of compressed data, to display the video at an arbitrary place on the bit map display 135, i.e., on the monitor displaying unit, and to transmit a video camera control code according to a control instruction of video camera input through the keyboard 130 or mouse 128 by the operator, to the video transmitting terminal.

Figure 2:
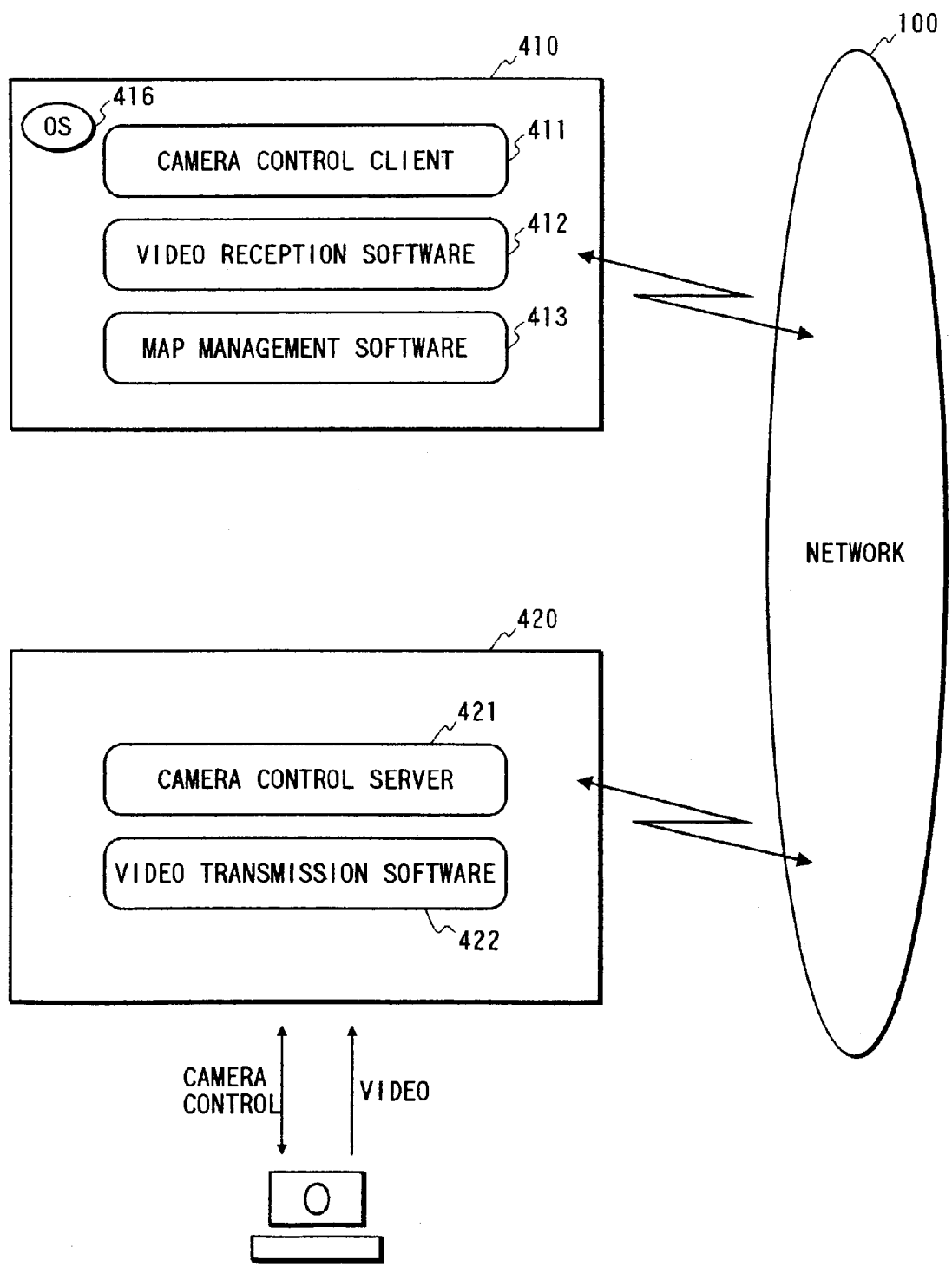
FIG. 2 is a block diagram of software in an embodiment of the present invention.

FIG. 2 is a drawing to show the software configuration of the present embodiment. Software 410 of the monitoring terminal 60 and software 420 of plural video communication terminals 20 and the like is connected to the network 100, and installed in the software 410 of the monitoring terminal is camera control client 411 for remote-controlling cameras each connected to the software 420 of video communication terminals on the network, video reception software 412 for expanding compressed video data sent in the form of packet from the video communication terminal and displaying the expanded data, and map management software 413 having a GUI capable of graphically displaying a map, a camera symbol, positions of cameras by scope display of FIG. 6 as detailed hereinafter, and pan and zoom and performing camera control. The video reception software 412 is software playing a main role for performing management of cameras of the all video transmitting terminals connected to the network 100, which retains camera names of the respective cameras, host names of the computers to which the cameras are connected, information about the cameras including the camera status of pan/tilt, zoom, and the like and about whether they are controllable or not, and information indicating the present status about which camera is under control at present and a video of which camera is under display. The camera control client 411 and map management software 413 also shares these information to utilize it for display change of camera symbol or the like. Numeral 421 is software for controlling the conditions of camera including pan/tilt, zoom, white balance, and so on for the camera connected to such a terminal and for storing the video data output from the camera, which is called a camera control server. Numeral 422 designates software working together with the video reception software.

Figure 3:
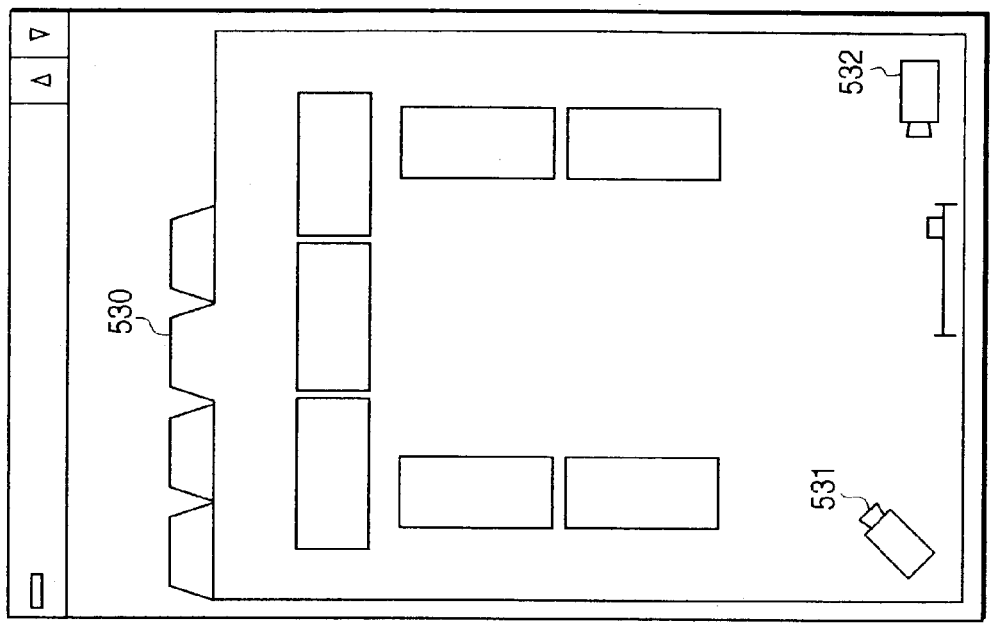
FIG. 3 is a screen example of the embodiment.
Figure 4:
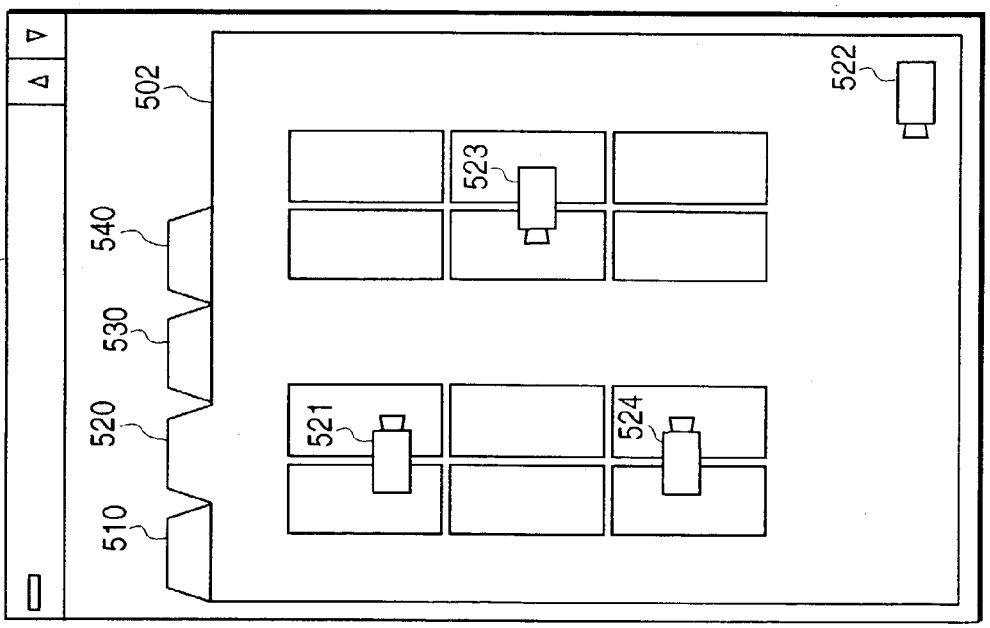
FIG. 4 is a drawing to show a screen after switch of map to 530.
Figure 5:
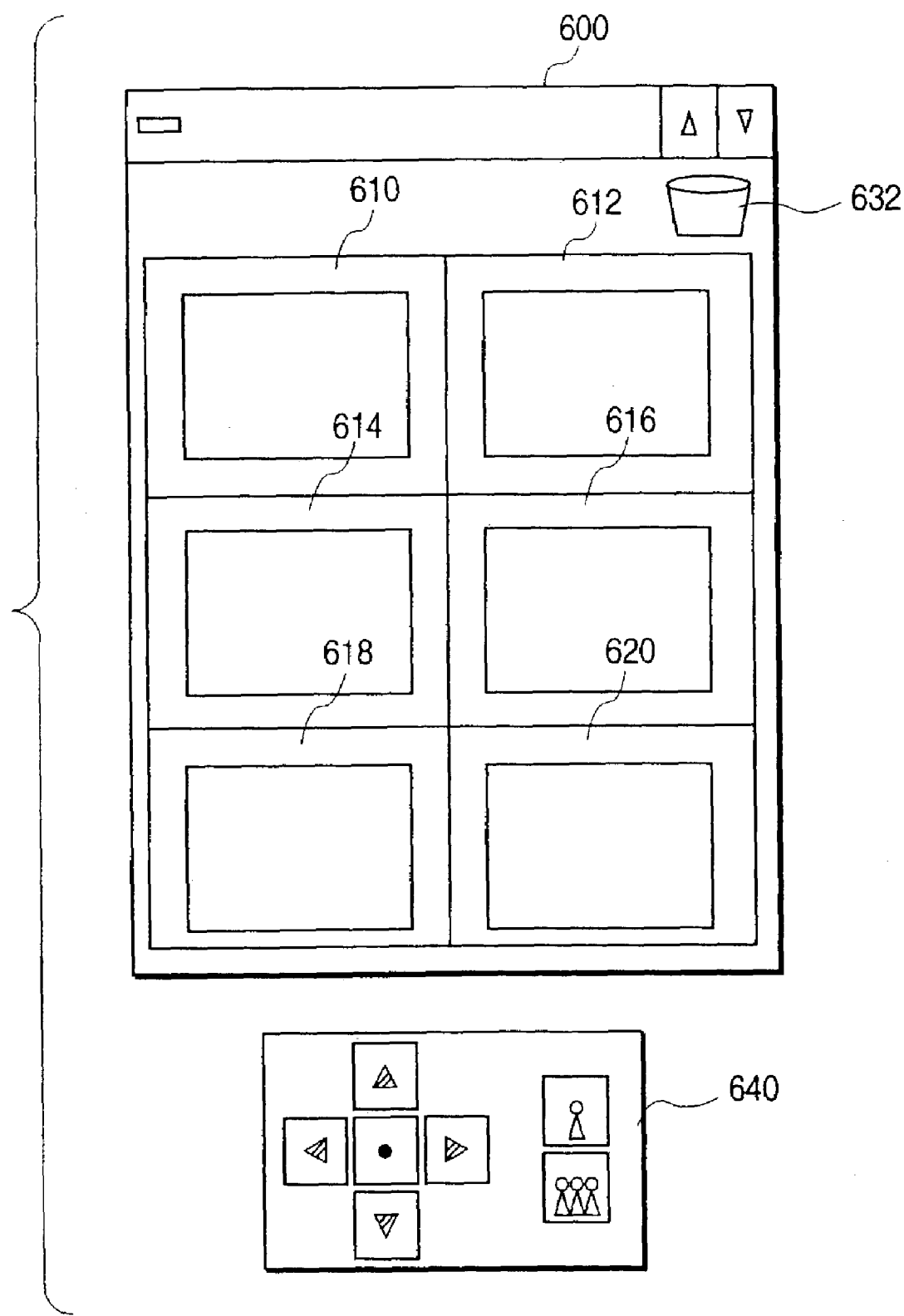
FIG. 5 is a drawing to show an example of video display window 600 of the embodiment.

FIG. 3 shows an example of the screen displayed on the bit map display 135 of the monitoring terminal 410. Numeral 500 represents a map window, in which a plurality of maps 520, 530, 540, . . . , each indicating a layout of an office, a shop, or a warehouse, are managed in the present embodiment. There is no specific limitations on the number of maps, which can be determined depending upon the performance of system. A tag is attached to each map, and by clicking this tag with a mouse pointer, a map with the pertinent tag is displayed on a map display area 502. At the same as it, camera symbols are also displayed as being positioned on the pertinent map. FIG. 3 shows a state in which the map 520 among the maps 510 to 540 is displayed on the map display area 502 and in which camera icons 521, 522, 523, . . . located on the map 520 are displayed. Here, with clicking the tag of map 530, the map 530 is displayed on the map display area 502 as shown in FIG. 4, and at the same time, camera icons 531, 532, 533, . . . located on the map 530 are displayed. FIG. 5 is a drawing to show a window 600 to display input video signals, and this FIG. 5 shows an example in which the video signals received through the network 100 are displayed in respective windows.

In FIG. 5 numeral 600 designates a video display window, and areas 610, 612, 614, 616, 618, 620, . . . in the video display window are video display areas. There are six video display areas in the present embodiment, but the number of areas is not limited to this, of course. Further, the map window 500 shown in FIG. 3 and the video display window 600 shown in FIG. 5 may be displayed on a same screen or may be displayed on separate screens, i.e., on separate monitor units. Numeral 632 represents a garbage can icon for deleting a displayed camera video from a video display area. Numeral 640 denotes a panel for camera control, which has a variety of buttons for camera control and which can control pan/tilt and zoom of a selected camera. The panel 640 may be also displayed on the same screen as the windows 500, 600, or may be displayed on a different screen therefrom. Since how to display the screens departs from the spirit of the present invention, the details thereof are omitted herein.

Figure 6:
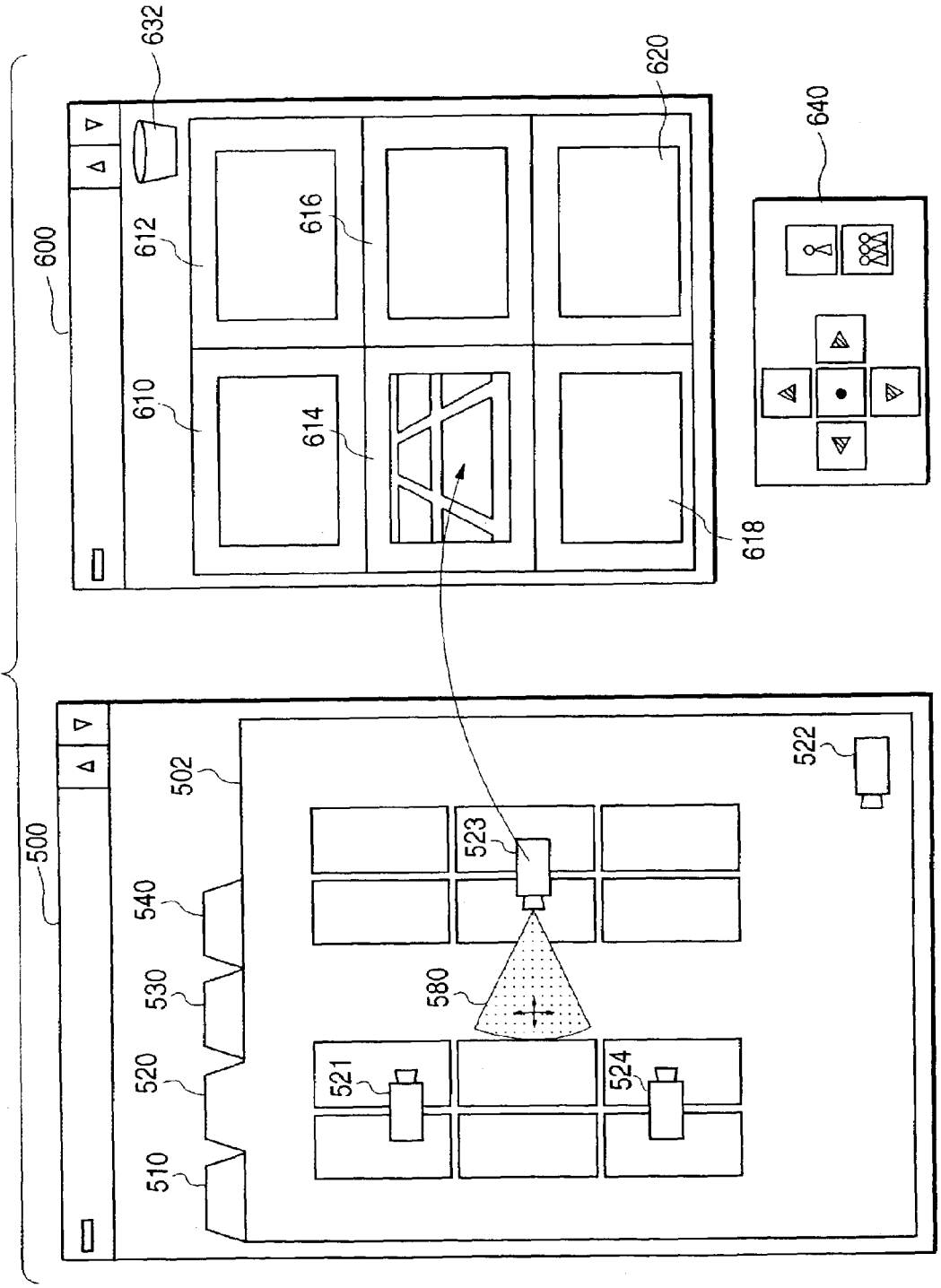
FIG. 6 is a drawing to show the state upon execution of display by D & D operation.
Figure 7:
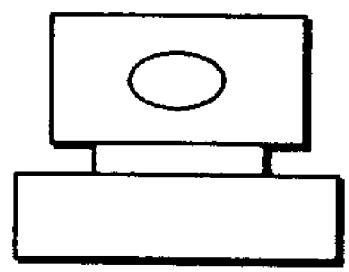
FIG. 7 is a drawing to show an example of the shape of mouse cursor upon D & D operation.
Figure 9:
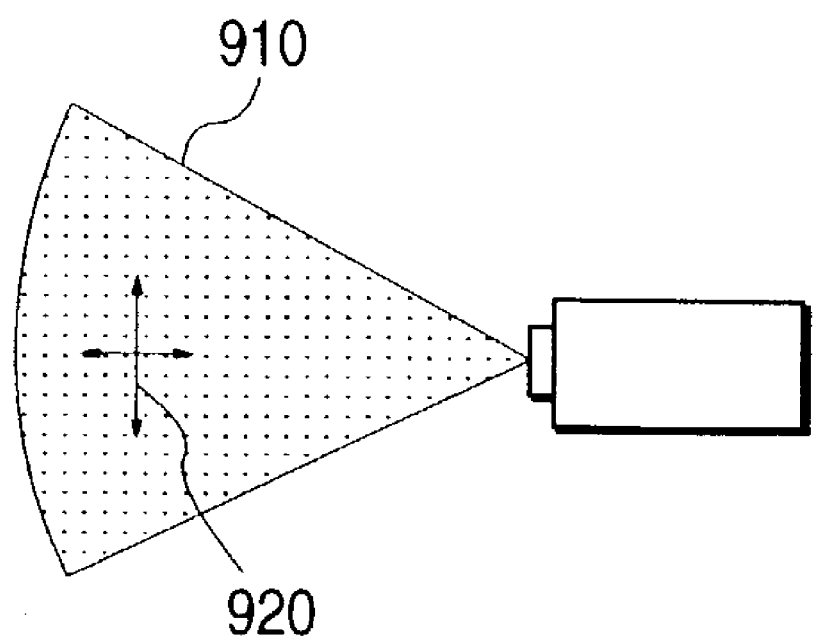
FIG. 9 is a drawing to show a display example of camera icon under video display.

The graphical user interface GUI of the monitoring system of the present embodiment will be next described using FIG. 6 to FIG. 10. The present embodiment is arranged so that when the drag and drop operation (hereinafter referred to as D & D) is performed to drag and drop a camera icon on the map 520, 530, . . . to an arbitrary video display area in the video display window, a moving picture from a camera corresponding to the icon dragged and dropped is displayed on the video display area where the icon is dropped. FIG. 6 shows a state upon D & D of video camera 523 to video display area 614. During drag the shape of the mouse cursor turns to the shape of camera as shown in FIG. 7, whereby the user can recognize that the operation of drag and drop is under way. At this time the map management software 413 searches the position information of the dragged camera for an ID number of the camera and sends the ID of the camera subjected to D & D to the video reception software 412, and the video reception software checks pan/tilt of camera, camera name, and host name to which the camera is connected, from this ID and sends such information to the camera control client 411 and to the map management software 413. Based on this information, the camera control client 411 starts network communication with the camera control server of the video transmitting terminal to which the pertinent camera is connected. After that, camera control is performed between them, and information about pan/tilt or the like of the camera is always sent from the camera control client 411 to the video reception software 412. The map management software performs updating of the maps stored in the video board 136 so as to change orientations of camera icons in correspondence to orientations of the actual cameras, to draw a scope 910 indicating progress of display as shown in FIG. 9, and to draw a control pointer 920 for controlling pan/tilt, and zoom of camera, in the scope 910.

This video camera display function is arranged so that when a video of another video camera is already displayed in a video display area of the video window for display, the previous display video is stopped and the new video is displayed, thus preforming replacement of display video.

The map management software is always notified of the information about pan/tilt of camera, etc. from the video reception software 413, so that whenever the conditions of pan/tilt, zoom, etc. of camera are changed on the camera control panel 640, the change is reflected immediately to the camera icons 521, 522, 523, . . . , 531, 532, 533, . . . Transmission of actual video is carried out based on a request from the video reception software 412. The video reception software 412 requests the video transmitting software 422 of the video transmitting terminal to which the pertinent camera is connected, to send data of one frame through the network 100. Receiving this request, the video transmitting software 422 divides data of the latest frame captured into packets and sends them to the video reception software 412. The video reception software 412 reconstructs the frame from the packets to display it in the pertinent video display area and again requests transmission of video. Repeating this at high speed, videos at a remote place are transmitted and displayed through the network. This permits the moving picture of video camera to be displayed on the bit map display. Display of videos of plural cameras can be realized by repetitively performing the processes of issue of video transmission request, compression of captured video, packet division, network transmission, packet reception, frame reconstruction, expansion of compressed data, and display in order against the video transmission softwares to which the respective cameras are connected.

Movement of the display position of video camera image can be realized by performing the D & D operation of the displayed video to a video display area desired as a destination, as shown in FIG. 8. FIG. 8 shows a state in which the video of video camera 523 having been displayed in the video display area 614 was moved to 612. This moving function is arranged so that when another video camera image is already displayed in the destination-video display area, the previous display video is stopped and the new video is displayed therein, thus performing replacement of display video.

At this time the video reception software 412 clears the pertinent video display area and changes internal parameters so as to designate the D & D destination as an area for the video of the pertinent video camera to be displayed. Thereafter, the video is displayed in the D & D destination. This operation will never interrupt the logical network connection. Namely, the network once connected is maintained without being interrupted until the video display area is dragged and dropped to the garbage can icon 632 as detailed hereinafter. For stopping the display of video camera image, the video display area in which the video of video camera desired to stop displaying is displayed is dragged and dropped to the garbage can icon 632 in the video display window, as shown in FIG. 10, whereby display of the pertinent video can be stopped. FIG. 10 shows a state after execution of display stop of the video of video camera 523 having been displayed in the video display area 614. At this time the video reception software 412 clears the pertinent video display area and stops issue of video transmission request to the pertinent video transmission software. Further, it notifies the camera control client 411 and map management software 413 of stop of display. Receiving this notification, the camera control client 411 interrupts the network connection with the video transmission terminal and clears the pertinent video display area. Further, the map management software 413 removes the scope display from the camera icon 523 of the pertinent camera to update the map.

The software of the apparatus in the present embodiment as described above will be explained referring to FIG. 11.

Figure 12:
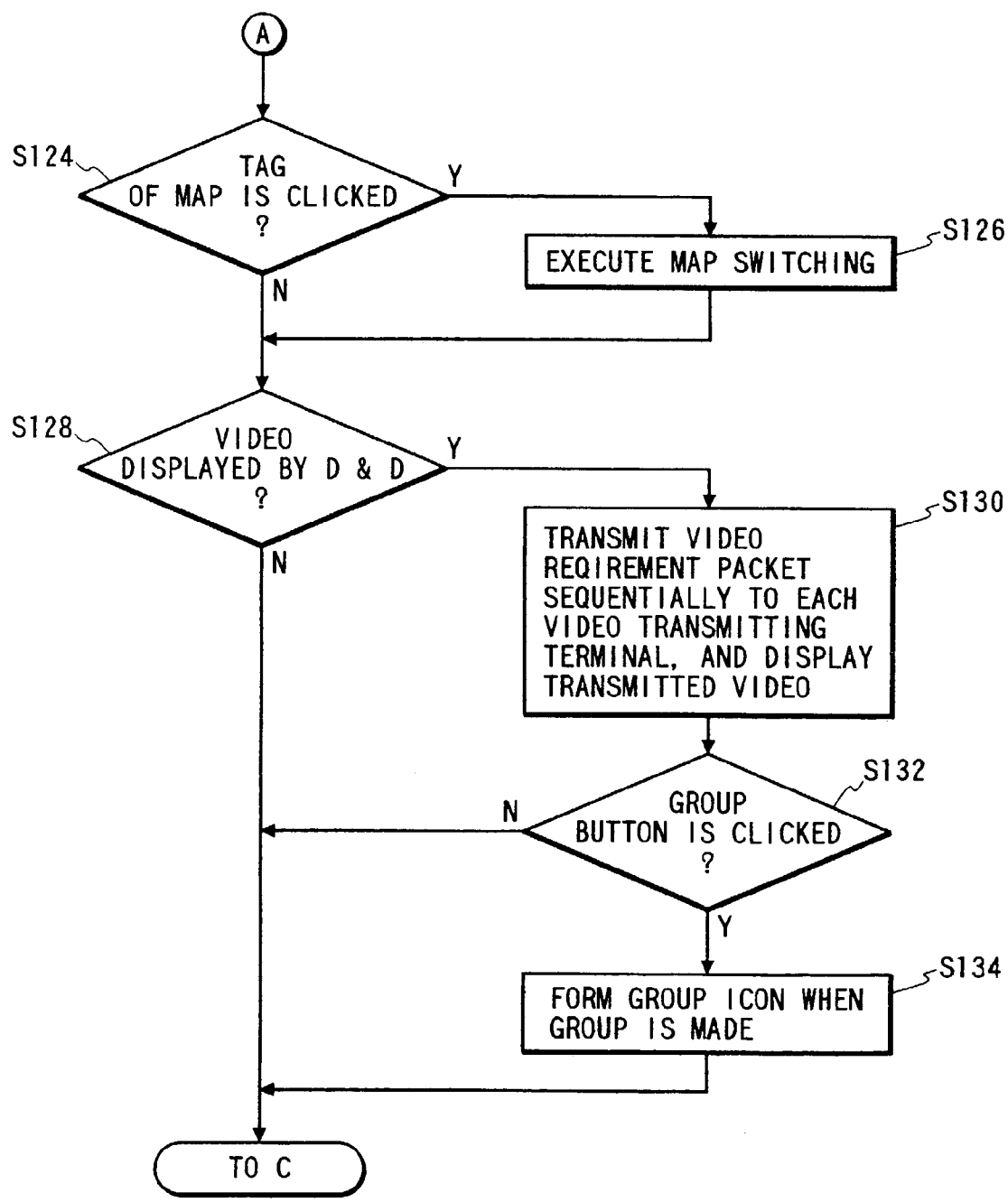
FIG. 12 is a flowchart to show the operation of the entire apparatus of the present embodiment.
Figure 13:
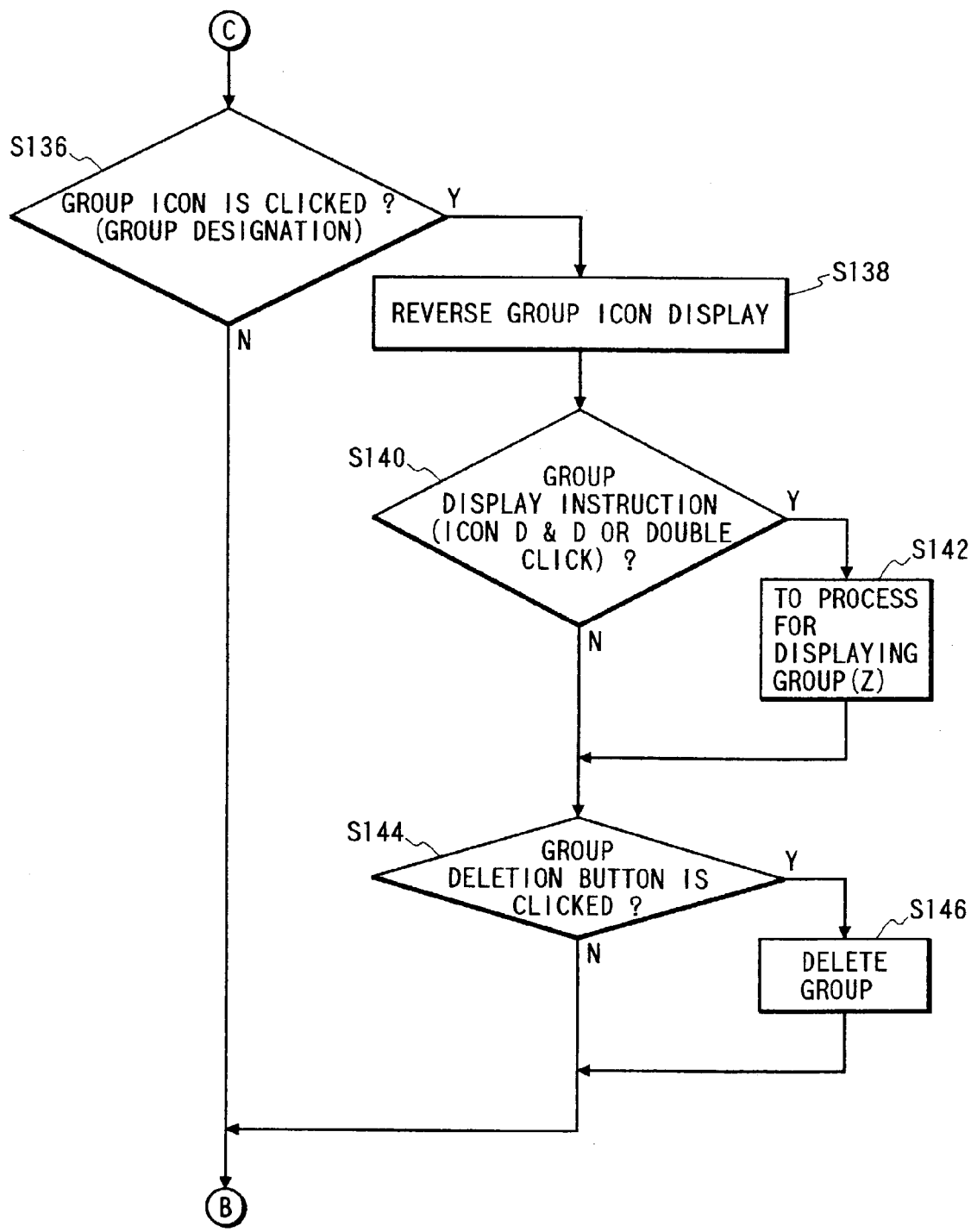
FIG. 13 is a flowchart to show the operation of the entire apparatus of the present embodiment.

FIG. 11 to FIG. 13 are a flowchart to show the operation of the whole apparatus of the present embodiment.

Steps in the flowchart will be explained.

S100: The map management software 413 shown in FIG. 2 displays the map window, for example denoted by 500 in FIG. 3, on the bit map display 35.

S102: After S100, the video reception software 412 shown in FIG. 2 displays the video window 600, for example shown in FIG. 5, on the same display 35.

S104: After S102, the camera control client 411 shown in FIG. 2 displays the camera control panel 640 shown in FIG. 6 on the same display 35.

S106: It is determined whether a camera icon displayed on the map window shown in FIG. 3 is clicked; if clicked then the flow goes to S108; if not clicked then the flow goes to S112.

Here, though the sequence of description is inverted, it is noted that the steps of FIG. 11 are carried out by OS compatible with the CPU 122. In the above description S100, S102, and S104 are executed separately, but the step of S100 may be arranged to invoke the routines of S102 and S104 to carry out them.

S108: Switching of focus clicked is executed. Namely, the clicked camera is fixed. In other words, it is determined which camera is the selected camera.

S110: A display process routine detailed hereinafter is started. Such a routine will be described hereinafter with reference to FIG. 14.

S112: It is determined whether a desired video out of the videos displayed on the video window 600 shown in FIG. 5 is clicked. If clicked then the flow goes to S114. If not clicked then the flow proceeds to S120.

S114: When a video is clicked, it is determined whether the position of a camera generating a signal of the clicked video is displayed on the map window shown in FIG. 3. If not displayed, the map management software 413 is instructed with an instruction for executing such switching of map as to display a map including the camera in the window shown in FIG. 3.

S116: Executed is switching of focus of the camera corresponding to the clicked video in the same manner as in S108.

S118: A display movement control and stop process routine detailed hereinafter is started.

Figure 16:
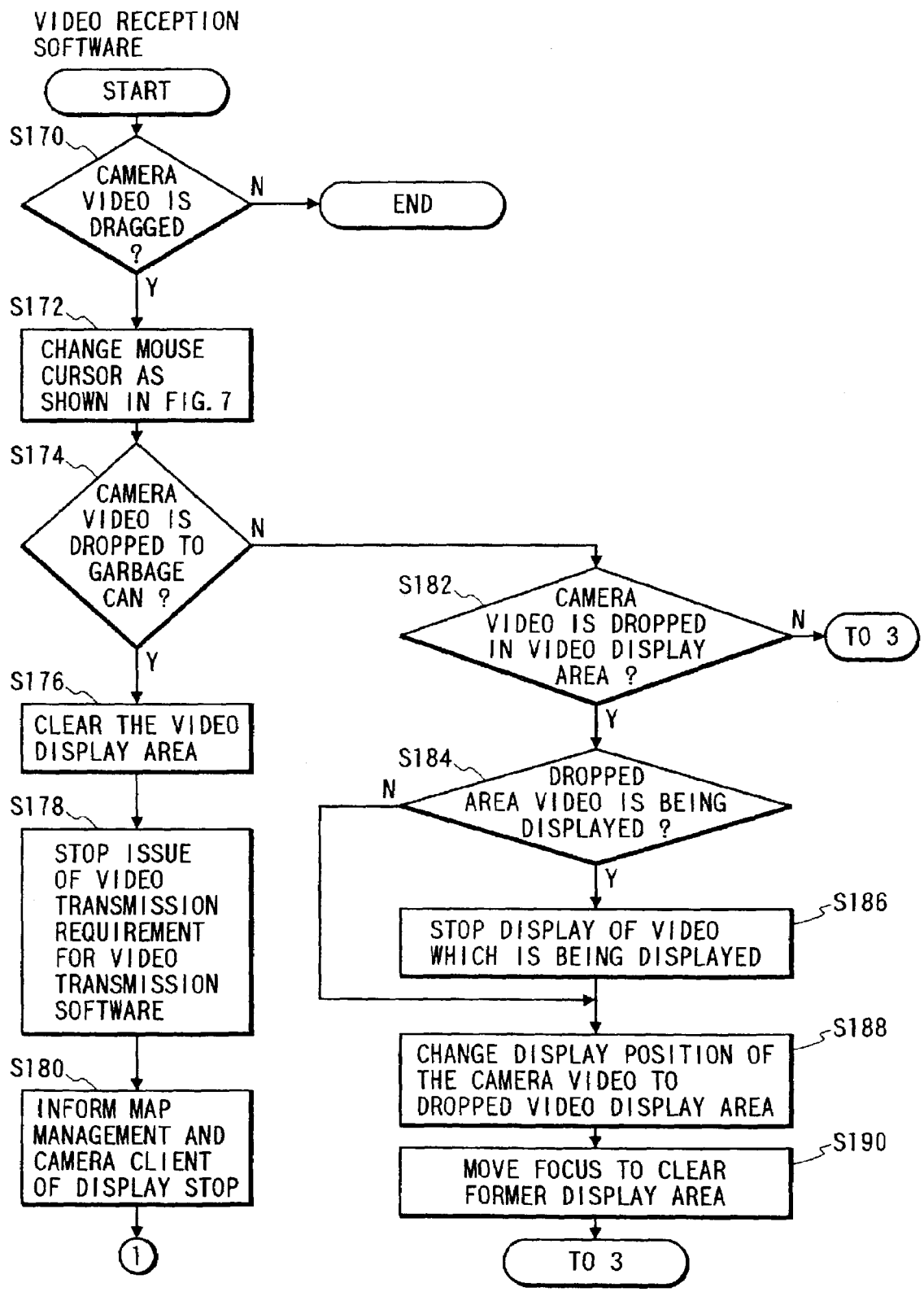
FIG. 16 is a flowchart to show the details of start routine of display movement and stop process in S118 shown in FIG. 11.

Such a routine will be described hereinafter with reference to FIG. 16.

S120: It is determined whether the camera control panel 640 shown in FIG. 6 is clicked. When clicked, the flow branches to S122.

S122: A command designated by the control panel is transmitted through the network 100 to the clicked camera.

S124: It is determined whether either one of the tags 510 to 540 of the map shown in FIG. 3 is clicked. When clicked, the flow proceeds to S126. If not clicked, the flow proceeds to S128.

S126: The map management software 413 is so instructed as to display a map corresponding to the clicked map out of the tags 510 to 540 among the maps.

S128: It is determined whether there is a video designated as a video to be displayed by D & D on the map displayed on the bit map display 35. If there is a designated video, the flow goes to S130; if not the flow goes to S136.

S130: If there is a designated video, a packet including a video request signal is transmitted sequentially to a camera or to a video signal transmitting terminal corresponding to the video, and a video transmitted from the terminal requested by the packet is displayed on the bit map display 35. Such a packet is provided with an address on the network for designating the camera or video signal transmitting terminal corresponding to the video.

S132: It is determined whether a grouping button is clicked. If clicked the flow proceeds to S134. If not clicked the flow proceeds to C.

S134: Cameras transmitting their camera videos on the bit map display 35 are grouped and a group icon is formed.

S136: It is determined whether the group icon is clicked. If the group icon is clicked then the flow goes to S138. If not the flow goes to B.

S138: The clicked group icon is displayed in reverse video.

S140: It is determined whether a display instruction of the group icon is given. If the display instruction is given the flow goes to a group display flow of S142. Since the group display flow is not embraced in the essence of the present invention, the description thereof is omitted herein. If the display instruction is not given then the flow goes to S144.

S144: It is determined whether a group deletion button 710 is clicked. When the group deletion button 710 is clicked, the flow goes to S146. When the group deletion button 710 is not clicked, the flow goes to B.

S146: The designated group is deleted.

Figure 14:
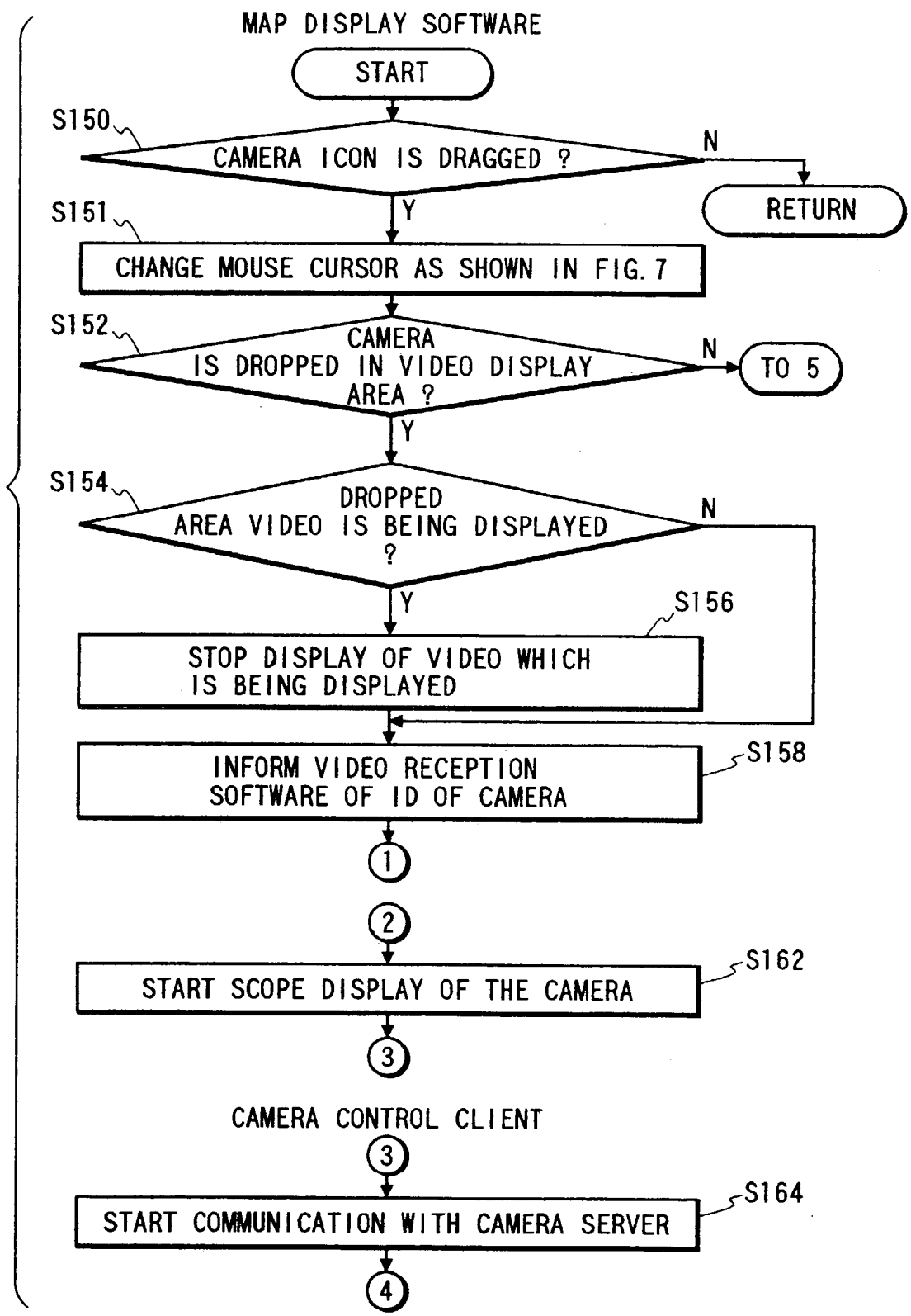
FIG. 14 is a flowchart to show the details of display process routine in S110 shown in FIG. 11.
Figure 15:
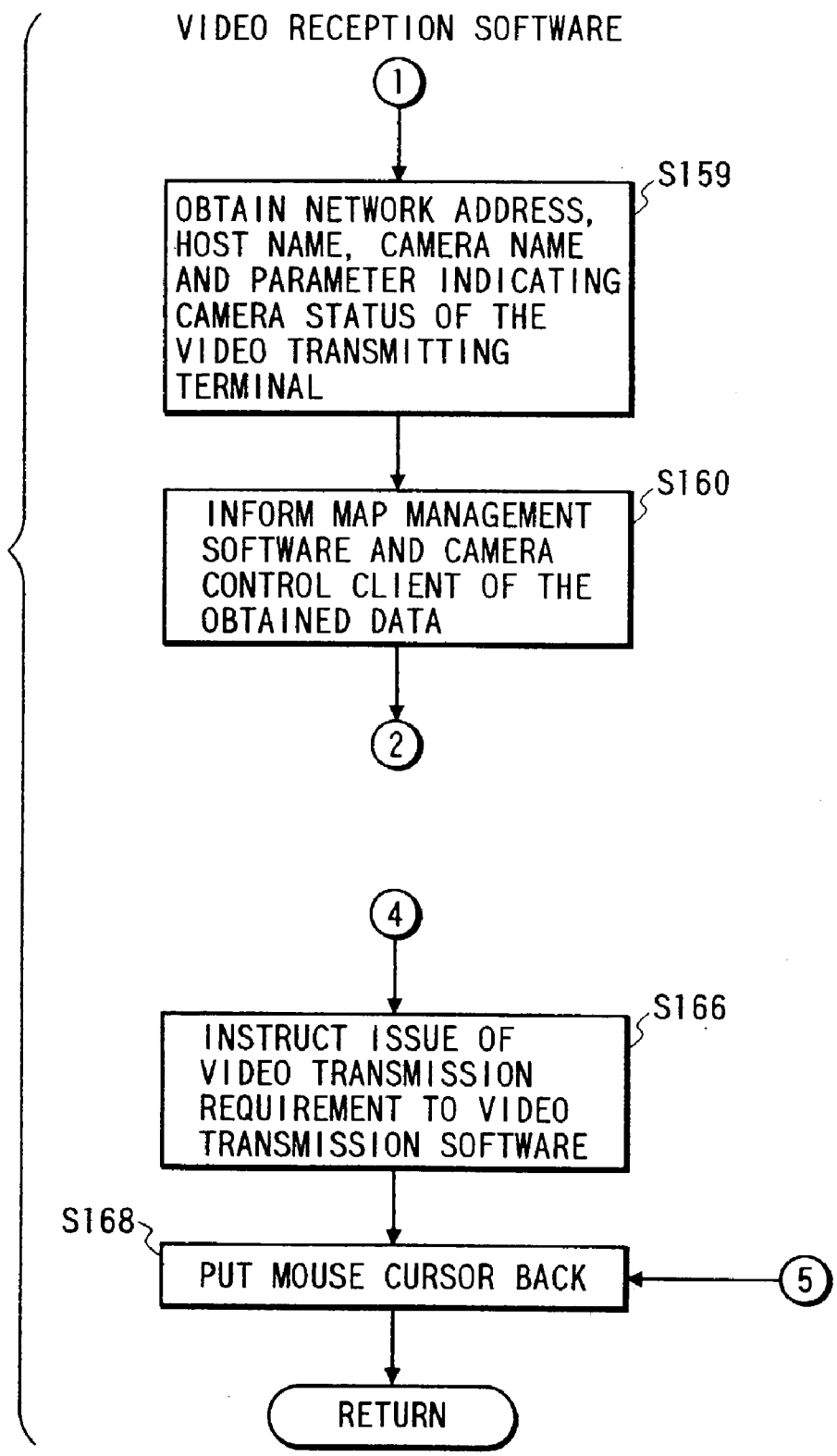
FIG. 15 is a flowchart to show the details of display process routine in S110 shown in FIG. 11.

The display process routine described in S110 will be next explained referring to FIG. 14.

S150: In such a routine, first, it is determined whether a camera icon on display is dragged. In such a flow, if the user continues clicking the camera icon from S106 of FIG. 11 to this step, the flow goes to S151. If the user releases clicking, this step is ended and the flow returns to the original routine.

S151: The mouse cursor is changed to such an indication as shown in FIG. 7 during dragging in order to permit the user to easily recognize that the camera is being dragged.

The mouse cursor does not have to be limited to this example, but may be displayed in another display form. The point is that the user can recognize that the camera is under drag.

S152: Whether the camera of the cursor shape exemplified in FIG. 7 is dropped is determined from the status of the click button of the mouse 128.

It is determined whether the dropped camera is dropped into either one of the video display areas 610 to 620 shown in FIG. 5. This determination is executed in such a way that the map management software 413 compares coordinates between each area of the video display areas 610 to 620 and a position where the cursor of the camera shape was dropped; if the cursor is dropped in an area then the flow branches to S154; if the cursor is dropped outside of the areas then the flow branches to S168 to put the mouse cursor back. Namely, the cursor is returned to the status before the camera is dragged in S150.

S154: The map management software 413 determines whether the video of the dropped area is being displayed.

The map management software 413 performs such management as to always write in a table memory, information as to which video display area 610 to 620 as described previously is displaying a video from which camera.

If the dropped area is being displayed then the flow branches to S156; If not the flow branches to S158.

S156: If a video is already being displayed in the dropped area, display of the video under display is stopped (which is equivalent to dropping it into the garbage can).

S158: The video reception software 412 of FIG. 2 is informed of ID (identification information) of the camera subjected to D & D.

S159: Next obtained from the main memory unit 124 are the network address of the camera the ID of which was informed in S158, host name, camera name, and parameters indicating the status of the camera. Such parameters include focal length information, and data about a direction of white balance photography. The main memory unit 124 stores the network addresses, host names, camera names, and parameters indicating the camera status of the all image signal generators composing this system.

S160: The data obtained in S159 is output to the map management software 413 and to the camera control client 411.

S162: Based on the data acquired in S160, the scope display of the camera, for example, indicated by 580 in FIG. 6, which includes the angle of the field taken by the camera and the direction in which the camera of the focal length information is directed is displayed on the map.

S164: After S162, communication with the camera control server 421 is started.

S166: Then the video reception software 412 is instructed so as to transmit a video request signal for receiving a video signal from the selected camera, to the selected camera. The video reception software 412 repetitively outputs such video request signals regularly after it sends the video request signal to the selected camera and before transmission of video signal is stopped in S178 described hereinafter.

This causes the video camera to sequentially output image signals of each frame repetitively, whereby a moving picture is reproduced on the monitor.

S168: The mouse cursor having been moved by D & D is returned to the original position.

Figure 17:
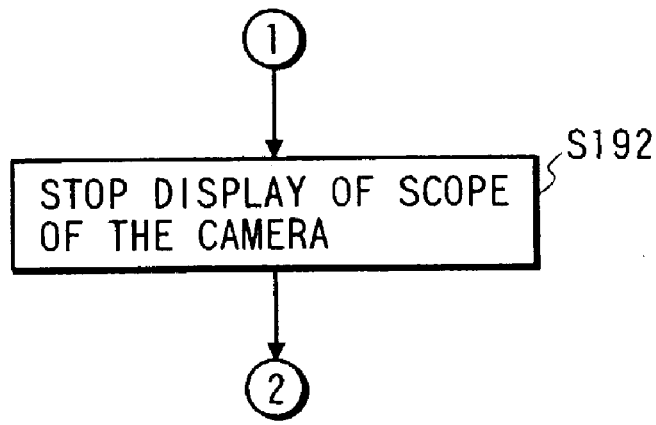
FIG. 17 is a flowchart to show the details of start routine of display movement and stop process in S118 shown in FIG. 11.
Figure 18:
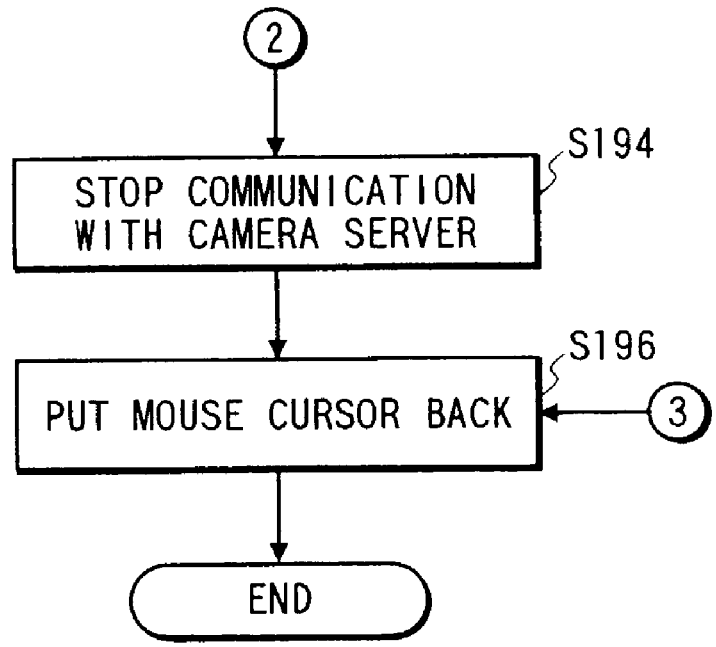
FIG. 18 is a flowchart to show the configuration of camera control client shown in FIG. 2.

The display movement and stop process routine shown in S118 of FIG. 11 is next described with reference to FIG. 16 and FIG. 17.

S170: It is determined whether the video clicked in S112 is continuously being clicked. If continuously being clicked the flow goes to S172; if clicking is already released, this routine is ended.

S172: The mouse cursor is changed to the shape, for example as shown in FIG. 7, in the same manner as in S151.

S174: It is determined whether the video dragged by the mouse cursor is dropped into the garbage can. If dropped into the garbage can the flow goes to S176; if not the flow goes to S182.

S176: If the video is dropped into the garbage can, the video display area subjected to D & D is cleared to display nothing. Alternatively, the display is changed to blue back.

S178: Issue of video transmission request is stopped for the transmission terminal, for example a video camera, having been transmitting the video cleared in S176 to the video reception software 412. This causes the communication terminal to stop communication of video signal.

S180: After S178, the map management software 413 and camera control client 411 is informed of stop of display on the bit map display 135, and then the flow moves to S192.

S182: If the camera video is not dropped into the garbage can icon in S174, it is determined into which video display area 610 to 620 the camera video was dropped.

S184: The same as S154

S186: The same as S156

S188: The video signal of the camera under D & D is displayed at a video display position where the icon was dropped.

S190: A video signal in the area in which the video image of camera has been displayed heretofore is cleared.

S192: The scope display of camera displayed in S162 is erased.

S194: Communication with the camera server is stopped.

S196: The same as S168

The present embodiment comprises, as described above, the means for dragging and dropping the camera symbol on the map to a video display area, thereby establishing the logical network connection between the monitoring terminal and the pertinent video transmission terminal, the means for moving a video display area displaying a video camera image to another video display area by D & D, and the means for dragging and dropping a video display area displaying a video camera image to the display stop symbol, thereby disconnecting the logical network communication, which permits an observer as a user to freely rearrange the display positions of video camera images so as to be easy to handle, and to select video camera images to be displayed simultaneously, thereby giving flexibility to operation of the monitoring system.

(Embodiment 2)

Figure 19:
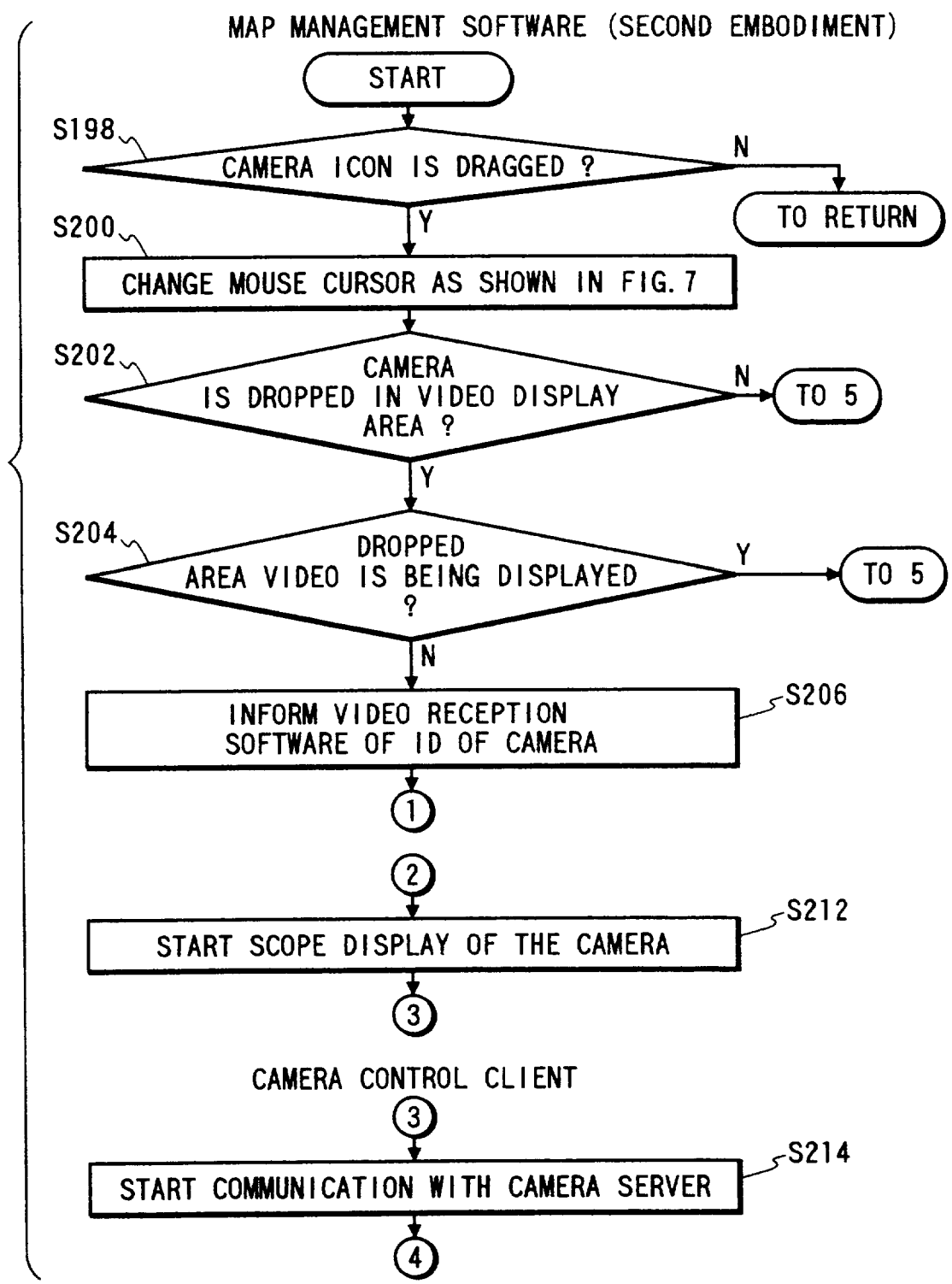
FIG. 19 is a flowchart to show the details of display process routine in S110 shown in FIG. 11, in Embodiment 2.
Figure 20:
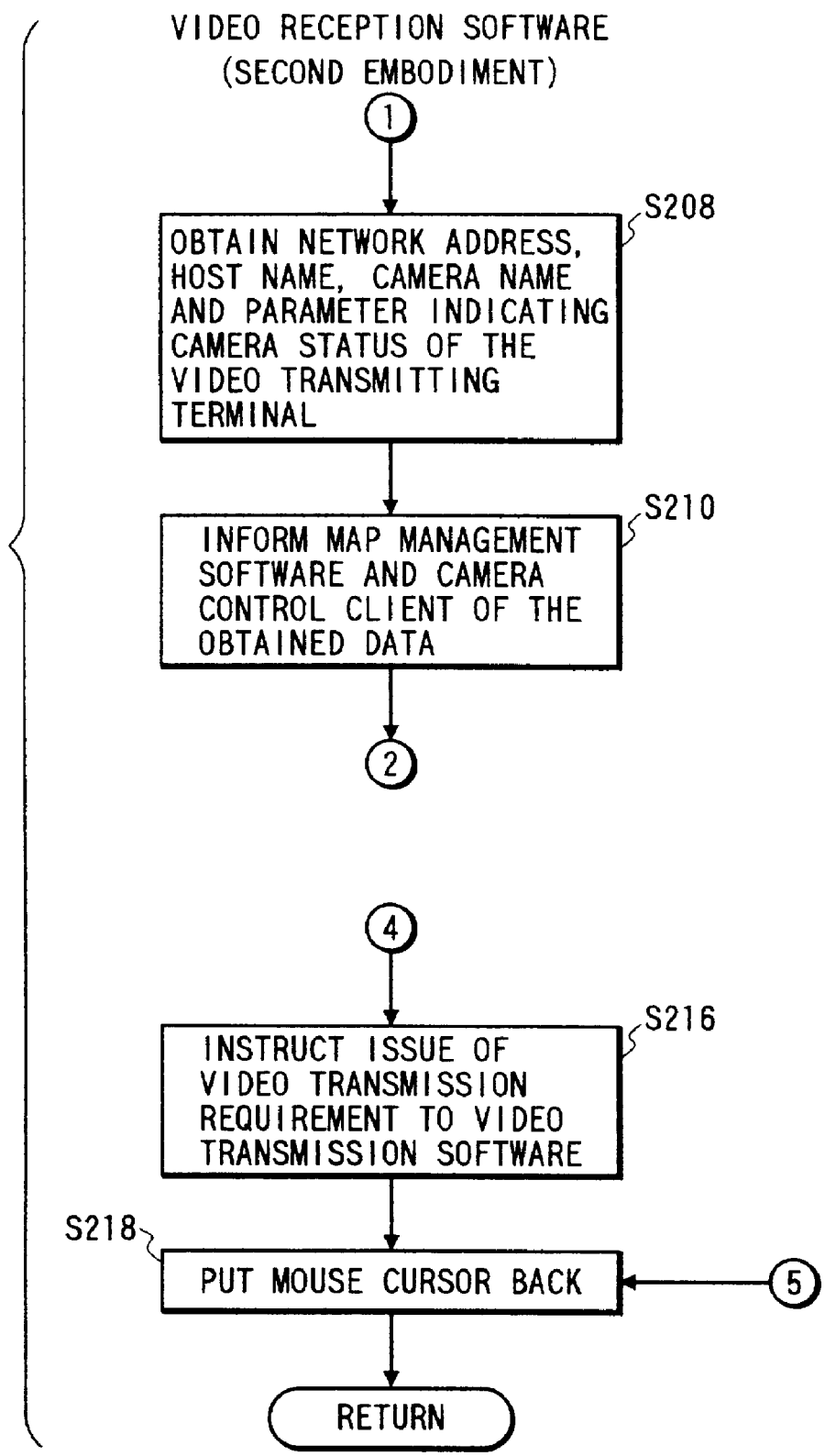
FIG. 20 is a flowchart to show the details of display process routine in S110 shown in FIG. 11, in Embodiment 2.

Embodiment 2 has the same basic processes as Embodiment 1, but is characterized in that upon the D & D operation of the video camera on the map to a video display area in order to display a video of the desired video camera in the video display area of the video window as shown by the operation in FIG. 6, if another video camera image is already displayed in that video display area, that event is detected and the display operation of that video is stopped. A flowchart to show the operation of software of this part is shown in FIG. 19 and FIG. 20.

Figure 21:
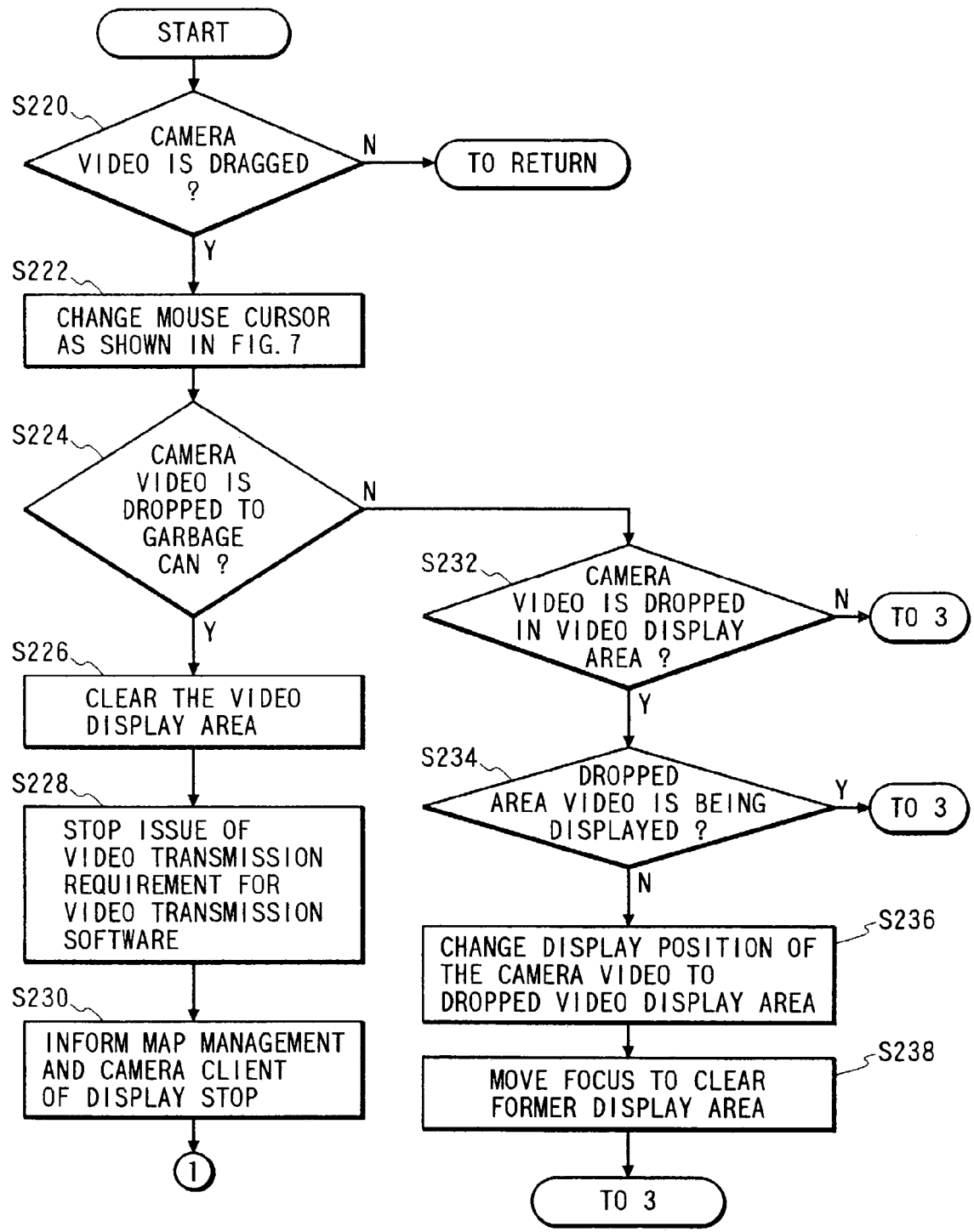
FIG. 21 is a flowchart to show the details of start routine of display movement and stop process in S118 shown in FIG. 11, in Embodiment 2.
Figure 22:
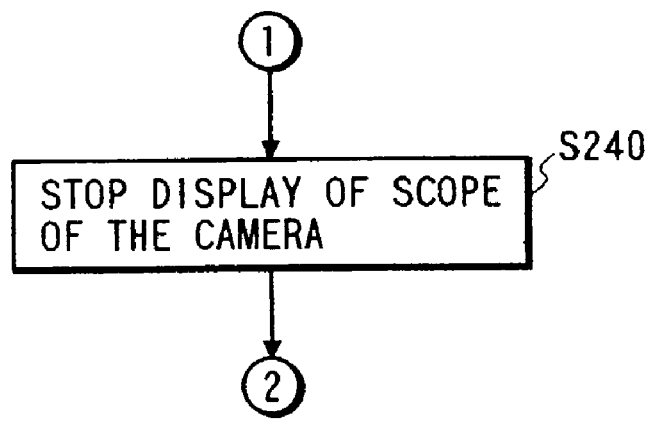
FIG. 22 is a flowchart to show the details of start routine of display movement and stop process in S118 shown in FIG. 11, in Embodiment 2.
Figure 23:
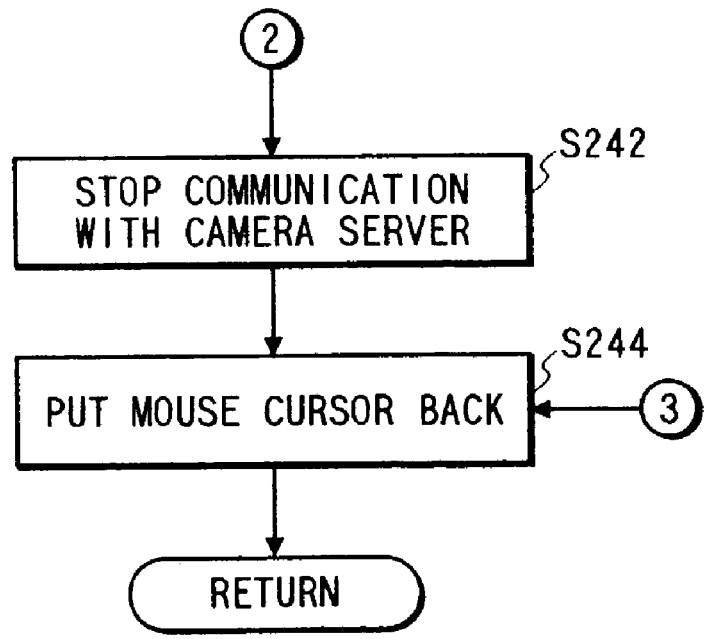
FIG. 23 is a flowchart to show the details of start routine of display movement and stop process in S118 shown in FIG. 11, in Embodiment 2.

Further, the present embodiment also has such a feature that upon the D & D operation to a video display area expected as a destination in order to move the display position of the video camera image as shown by the operation in FIG. 8, if another video camera image is already displayed in that video display area, that event is detected and the movement operation of that video is stopped. A flowchart to show the operation of software of this part is shown in FIGS. 21, 22, and 23.

The steps in the flowcharts shown in FIG. 19 to FIG. 23 will be described.

S198: The same as S150

S200: The same as S151

S202: The same as S152

S204: The map management software 413 determines whether a video is being displayed in the dropped area. The map management software 413 performs such management as to always write in the table memory the information as to a video of which camera is being displayed in which video display area 610 to 620 shown in FIG. 5. If a video is not being displayed then the flow goes to S206; if not being displayed then the flow branches to S218.

S206: The same as S158

S208: The same as S159

S210: The same as S160

S212: The same as S162

S214: The same as S164

S216: The same as S166

S218: The same as S168

S220: The same as S170

S222: The same as S172

S224: The same as S174

S226: The same as S176

S228: The same as S178

S230: The same as S180

S232: The same as S182

S234: The map management software 413 determines whether a video is being displayed in the dropped area. The map management software 413 performs such management as to always write in the table memory, the information as to a video of which camera is being displayed in which video display area 610 to 620 shown in FIG. 5. If a video is not being displayed the flow goes to S236. If a video is being displayed the flow branches to S244.

S236: The same as S188

S238: The same as S190

S240: The same as S192

S242: The same as S194

S244: The same as S196

The present embodiment is arranged so that upon the D & D operation of the camera symbol on the map to a video display area and upon the D & D operation to move a video display area displaying a video camera image to another arbitrary video display area, if another video camera image is already displayed in the pertinent area, such video display operation is stopped, whereby the video camera image already displayed can be prevented from being erased unintentionally.

(Embodiment 3)

Figure 24:
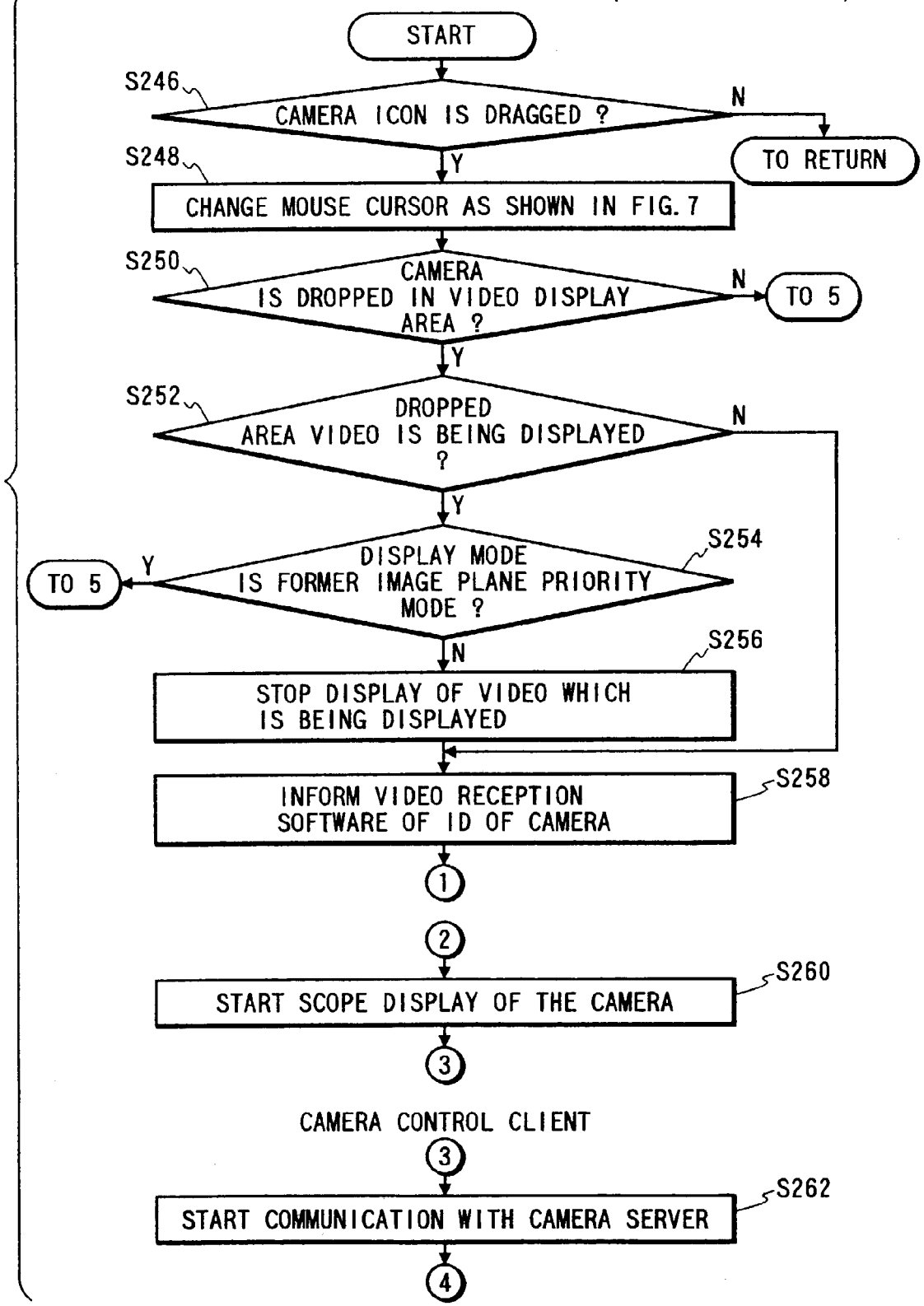
FIG. 24 is a flowchart to show the details of display process routine in S110 shown in FIG. 11, in Embodiment 3.
Figure 25:
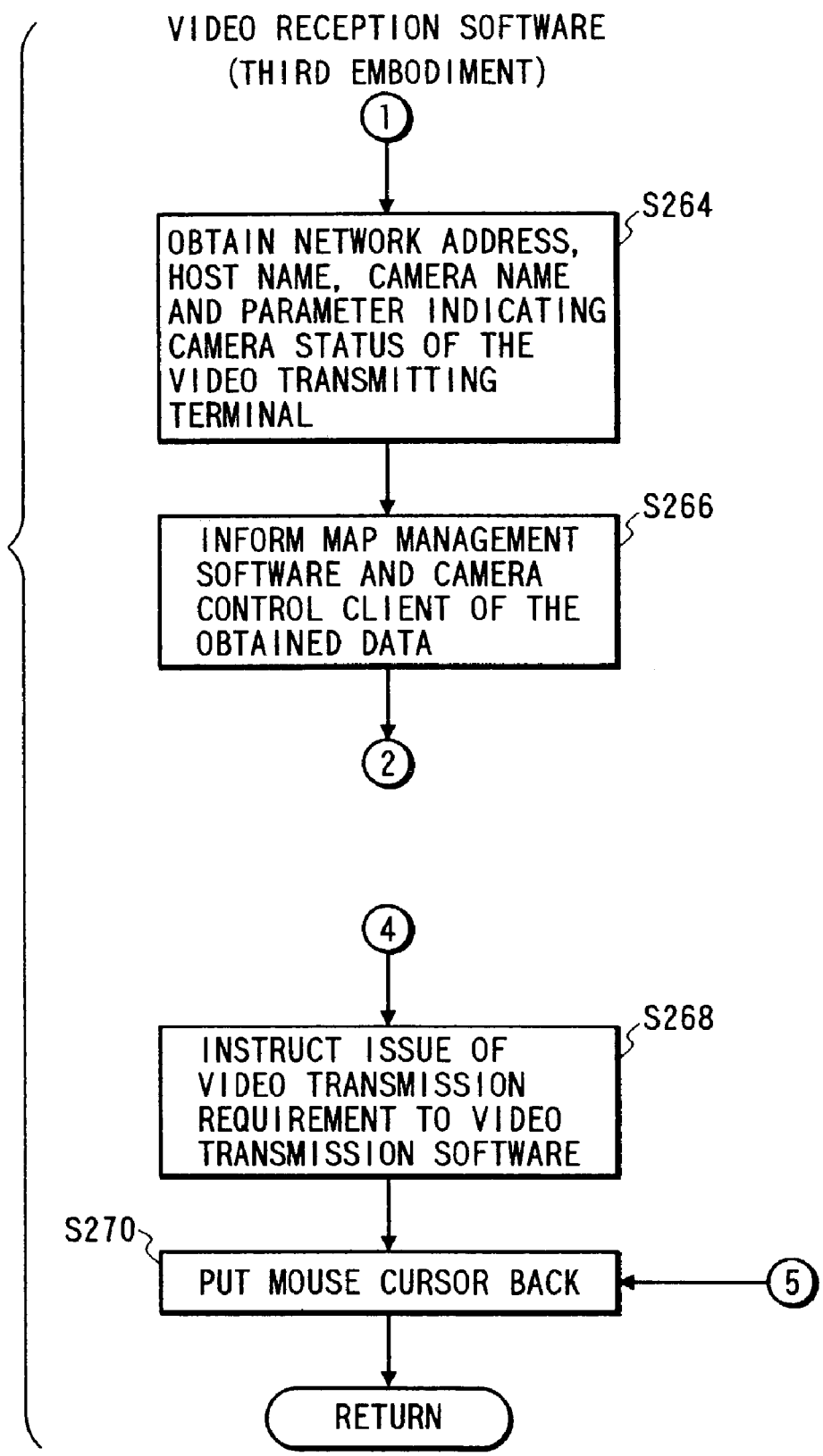
FIG. 25 is a flowchart to show the details of display process routine in S110 shown in FIG. 11, in Embodiment 3.

Embodiment 3 has the same basic processes as Embodiment 1, but has a function to switch the operation in accordance with binary information preliminarily stored, upon the D & D operation of a video camera on the map to a video display area in order to display a video of the desired video camera in a video display area of the video window, as shown by the operation in FIG. 6. Namely, the present embodiment is provided with two display modes, which are a display mode to give a higher priority to a video display already displayed (called a previous video) and a display mode to give a higher priority to a video display displayed newly (called a subsequent video), and it is arranged to preliminarily hold information about selection thereof and to keep the display of the previous video but stop display movement of the subsequent video in the case of the former display mode. In the case of the latter display mode, the subsequent video is displayed in a desired video display area and the display of the previous video is stopped, thus effecting replacement of video. A flowchart to show the operation of software of this part is shown in FIGS. 24 and 25.

Figure 26:
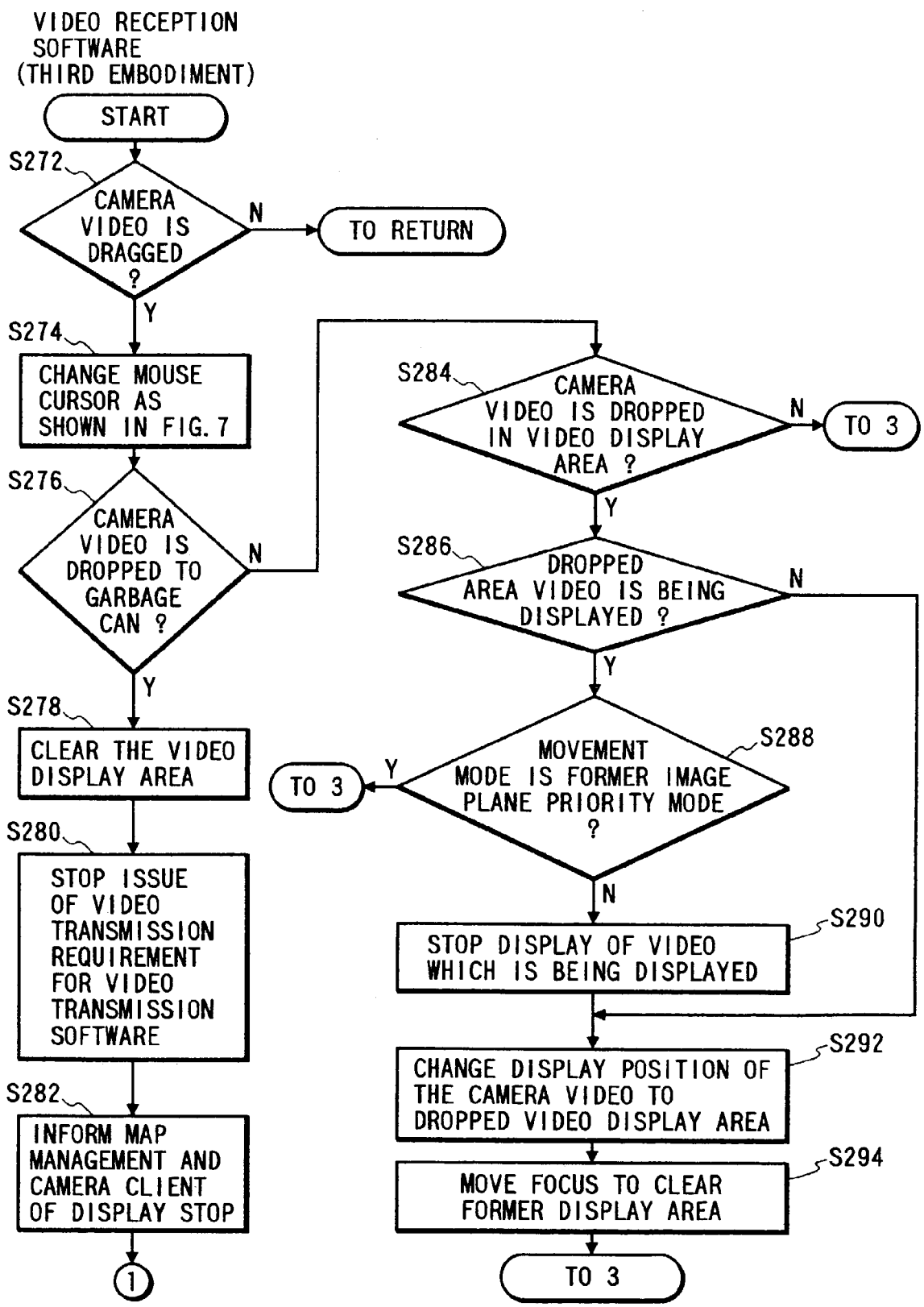
FIG. 26 is a flowchart to show the details of start routine of display movement and stop process in S118 shown in FIG. 11, in Embodiment 3.
Figure 27:
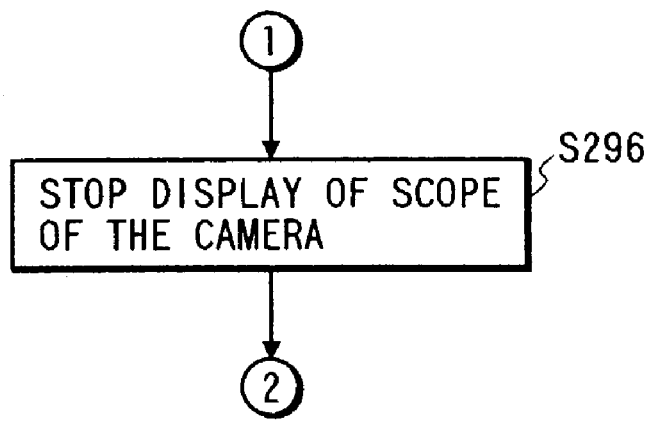
FIG. 27 is a flowchart to show the details of start routine of display movement and stop process in S118 shown in FIG. 11, in Embodiment 3.
Figure 28:
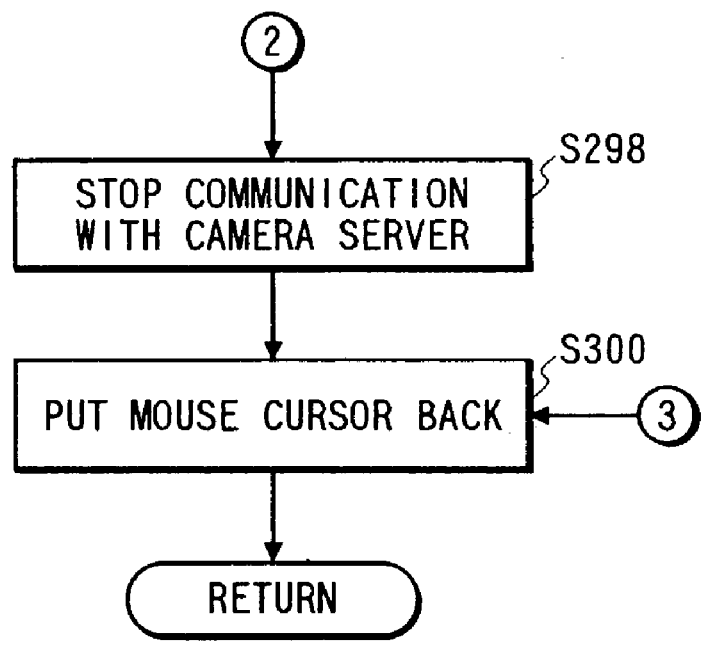
FIG. 28 is a flowchart to show the details of start routine of display movement and stop process in S118 shown in FIG. 11, in Embodiment 3.

Further, the present embodiment also has a function to switch the operation in accordance with binary information preliminarily stored, upon the D & D operation to a video display area expected as a destination in order to move the display position of video camera image as shown by the operation in FIG. 8. Namely, the present embodiment is provided with two modes, which are a display mode to give a higher priority to a video display already displayed (called a previous video) and a display mode to give a higher priority to a video display displayed newly (called a subsequent video), and it is arranged to preliminarily hold information to select one of them and to keep the display of the previous video as it is, but stop display movement of the subsequent video, in the case of the former display mode. Further, in the case of the latter display mode, the subsequent video is moved to a desired video display area, and display of the previous video is stopped, thus effecting replacement of video. A flowchart to show the operation of software of this part is shown in FIGS. 26, 27, and 28.

The steps in the flowcharts shown in FIG. 24 to FIG. 28 will be described below.

S246: The same as S150
S248: The same as S151
S250: The same as S152
S252: The map management software 413 determines whether a video is already displayed in the area after D & D. The map management software 413 performs such management as to always write in the table memory the information as to a video of which camera is displayed in which video display area 610 to 620 shown in FIG. 5. If a video is not displayed the flow branches to S258. If a video is displayed the flow goes to S254.
S254: The map management software 413 holds information about the display mode to display the video camera image in the video display area. This information is binary information for discriminating a mode for stopping a subsequent video display with giving a higher priority to display of previous video (called a previous screen priority mode) from a mode for replacing the display image with giving a higher priority to display of subsequent video (called a subsequent screen priority mode) when a new camera video image is attempted to be displayed in a video display area and if another camera video image is already displayed therein, and a value of the information is preliminarily stored.

The processing herein, depending upon the display mode, branches to S270 in the previous screen priority mode or proceeds to S256 in the subsequent screen priority mode.

S256: The same as S156
S258: The same as S158
S260: The same as S162
S262: The same as S164
S264: The same as S159
S266: The same as S160
S268: The same as S166
S270: The same as S168
S272: The same as S170
S274: The same as S172
S276: The same as S174
S278: The same as S176
S280: The same as S178
S282: The same as S180
S284: The same as S182
S286: The map management software 413 determines whether a video is already displayed in the area after D & D. The map management software 413 performs such management as to always write in the table memory the information as to a video of which camera is being displayed in which video display area 610 to 620 shown in FIG. 5. If a video is not displayed the flow goes to S292. If a video is displayed the flow goes to S288.
S288: The map management software 413 holds the display mode information about the display mode to display the video camera image in the video display area. This information is binary information to give a criterion for selection between the mode to stop movement of the subsequent video with giving a higher priority to display of previous image (called a previous screen priority mode) and the mode to replace the video image with giving a higher priority to display of subsequent video (called a subsequent screen priority mode) when the camera video image is moved to be displayed in a video display area and when another camera video image is already displayed therein, and a value thereof is preliminarily stored.

The processing herein, depending upon this display mode, branches to S300 in the previous screen priority mode or proceeds to S290 in the subsequent screen priority mode.

S290: The same as S186
S292: The same as S188
S294: The same as S190
S296: The same as S192
S298: The same as S194
S300: The same as S196

The present embodiment comprises the treatment method for the cases wherein upon new video display by the D & D operation of the camera symbol on the map to a desired video display area and upon the D & D operation to move a video display area displaying a video camera image to another desired video display area, another camera video is already displayed in the pertinent video area, which is arranged to enable to select either one of the following two display methods, according to the display mode information preliminarily stored. Namely, the present embodiment permits one to select either of the two display methods, which are the display method to give a higher priority to a camera video having been displayed heretofore and thereafter to stop display of a camera video intended to be newly displayed or to be moved, and the display mode to give a higher priority to the camera video intended to be newly displayed or to be moved and to stop display of the camera video having been displayed heretofore, thus replacing the video display screen of the pertinent display area.

Since the embodiments are arranged to perform network connection based on a display instruction to a specific position, in other words, since the network connection is not carried out based on a display instruction to a position other than the specific position, erroneous network connection can be prevented.

By referring to the attached drawings, other embodiments of the present invention will be described below.

Figure 29:
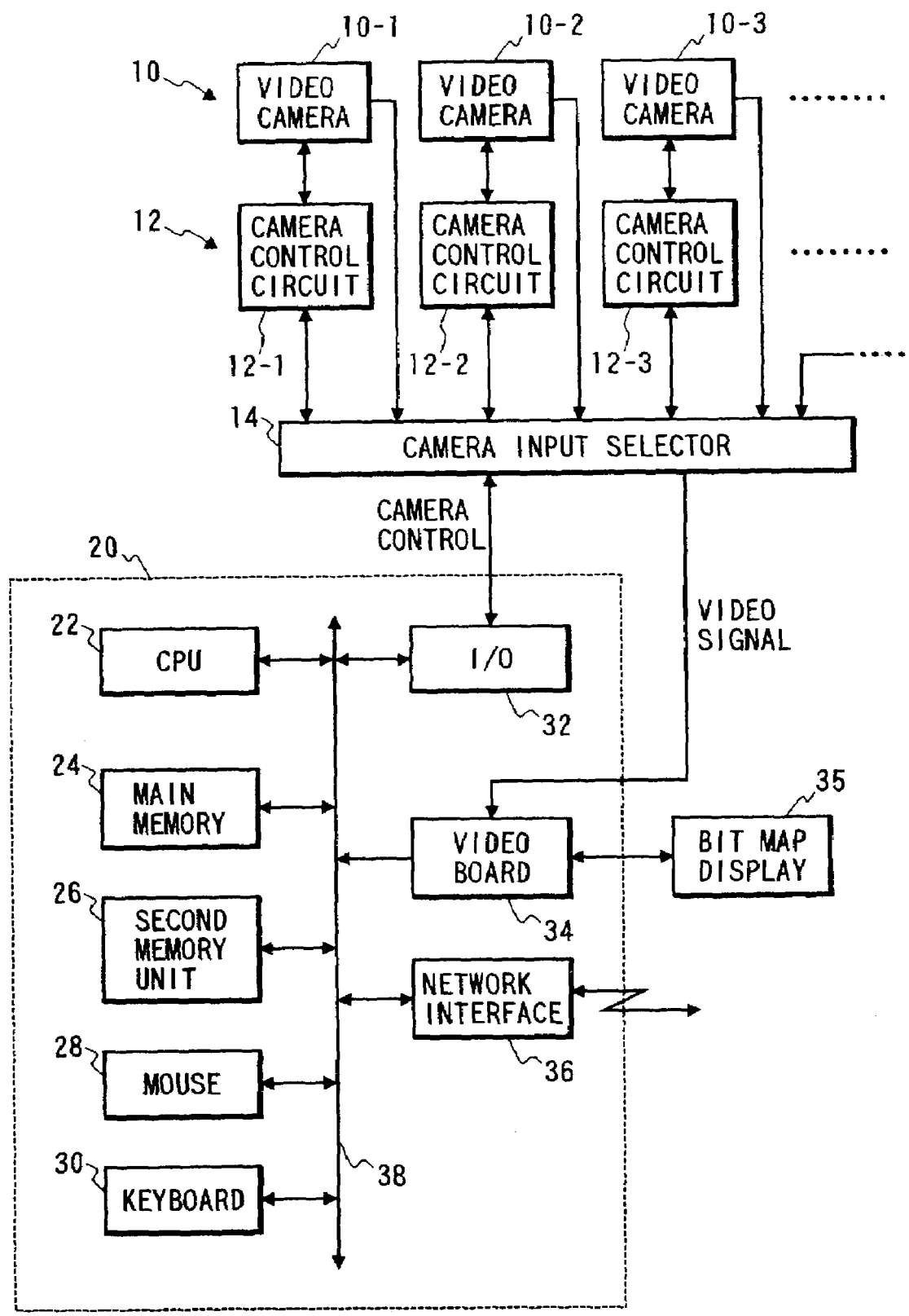
FIG. 29 is a block diagram to show a video communication terminal apparatus (video transmission-reception apparatus) according to another embodiment of the present invention.

In accordance with another embodiment of the present invention, a plurality of video communication terminals (substantially computers having the function of video communication) which connect with one camera device or a plurality of camera devices are connected to a computer network. Any of the communication terminals or an exclusive computer displays an image from a selected camera device or images from selected camera devices, and operates each camera device by remote control. FIG. 29 shows the schematic block diagram of a typical example of the plurality of video communication terminals which connect with the one camera device or a plurality of camera devices.

In FIG. 29, camera control circuits 12-1 to 12-3 directly control video cameras 10-1 to 10-3 to pan, tilt, zoom, adjust focuses, adjust exposure, and perform other operations, in accordance with external control signals. A camera input selector 14 selects which of the video cameras 10-1 to 10-3 to control, in order to take in an output signal from the selected camera (the output signal is normally a video signal, but both a video signal and an audio signal when a microphone-equipped camera is used). As a communications line, for example, RS-232C and so forth are used, however, it is obvious that the present invention is not limited thereto.

A video communication terminal apparatus (video transmitter-receiver apparatus) 20 sends a control command to a desired camera controller 12-1, 12-2 or 12-3 through the camera input selector 14 to control one of the video cameras 10-1 to 10-3 connected to the selected camera controller. This video communication terminal apparatus 20 also transmits a video signal from the selected camera to a network, while it receives a video signal from the network. The video communication terminal apparatus 20 includes a central processing unit (CPU) 22 for controlling the whole of the apparatus 20, a main memory 24, a second memory unit 26 (for example, a hard disc unit), a mouse 28 serving as a designating device, and a keyboard 30.

An input/output (I/O) port 32, which is connected to the camera input selector 14, supplies it with a camera control command. A video board 34 takes in the video signal from the video camera selected by the camera input selector 14, and displays various images on a bit-map display 35. A network interface 36 connects the video communication terminal apparatus 20 to a computer network or a communications network. The respective devices, namely, the CPU 22 to the video board 34 and the network interface 36, are mutually connected by a system bus 38. The network interface 36 enables the video communication terminal apparatus 20 to control a camera that is connected to a camera controller at a distant place by sending a control signal to the camera through the network, and to receive a camera control signal through the network.

The camera input selector 14 selects one control signal line and its video output from control signal lines connected to the camera control circuits 12-1 to 12-3 in order to supply the video board 34 with the selected video output, and logically connects the selected control line to the I/O port 32. As a video signal form, for example, the NTSC signal is used. The video board 34 takes in a video signal outputted from the camera input selector 14. The video signal taken in is displayed as a moving-image in a predetermined window on the bit-map display 35. The video board 34 also has the function of compressing or expanding the video signal.

In the second memory device 26, a variety of information related to the cameras 10-1 to 10-3 and other cameras connected to the apparatus 20 through the network, for example, camera position information data, camera figure data and so forth are stored.

When the camera input selector 14 is connected to only one of the video cameras 10-1 to 10-3, it does not need to be used. The corresponding camera controller 12 may be directly connected to the I/O port 32. When the video camera 10 is a type in which pan, tilt and so forth cannot be controlled, the camera control circuit 12 does not need to be used. When no video camera is used, in other words, when a video camera connected to another video communication terminal is operated by remote control to display only an image from the camera by using the video communication terminal apparatus 20, it is unnecessary to use any of the video cameras 10-1 to 10-3, any of the camera control circuits 12-1 to 12-3 and the camera input selector 14.

Figure 30:
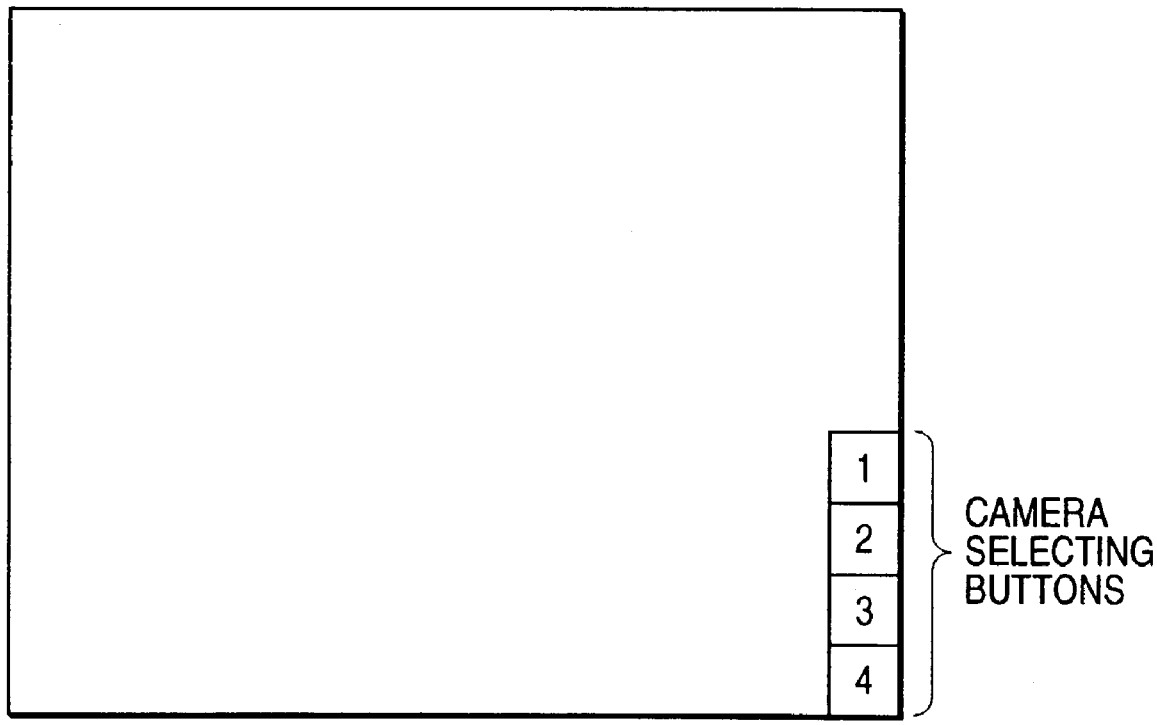
FIG. 30 is a schematic view to illustrate a screen for displaying an image from a video transmission apparatus to which a plurality of cameras are connected.

FIG. 30 shows an example of the video display window displayed on the bit-map display 35 when the video communication terminal apparatus 20 is connected to four video cameras. In the bottom right corner of the display screen, buttons (camera selecting buttons) for selecting the cameras which output images to be displayed within the display screen are displayed in a small size. The user can select one specified camera for displaying an image by selecting one button from these buttons on the screen. A similar video display window is formed on the screen of another video communication terminal apparatus that receives an image from this video communication terminal apparatus and displays the received image. By operating camera selecting buttons on the screen at the receiving side, any of the video cameras connected to the transmitter's video communication terminal can be selected and its output image can be displayed on the screen of the receiver's video communication terminal apparatus.

Figure 31:
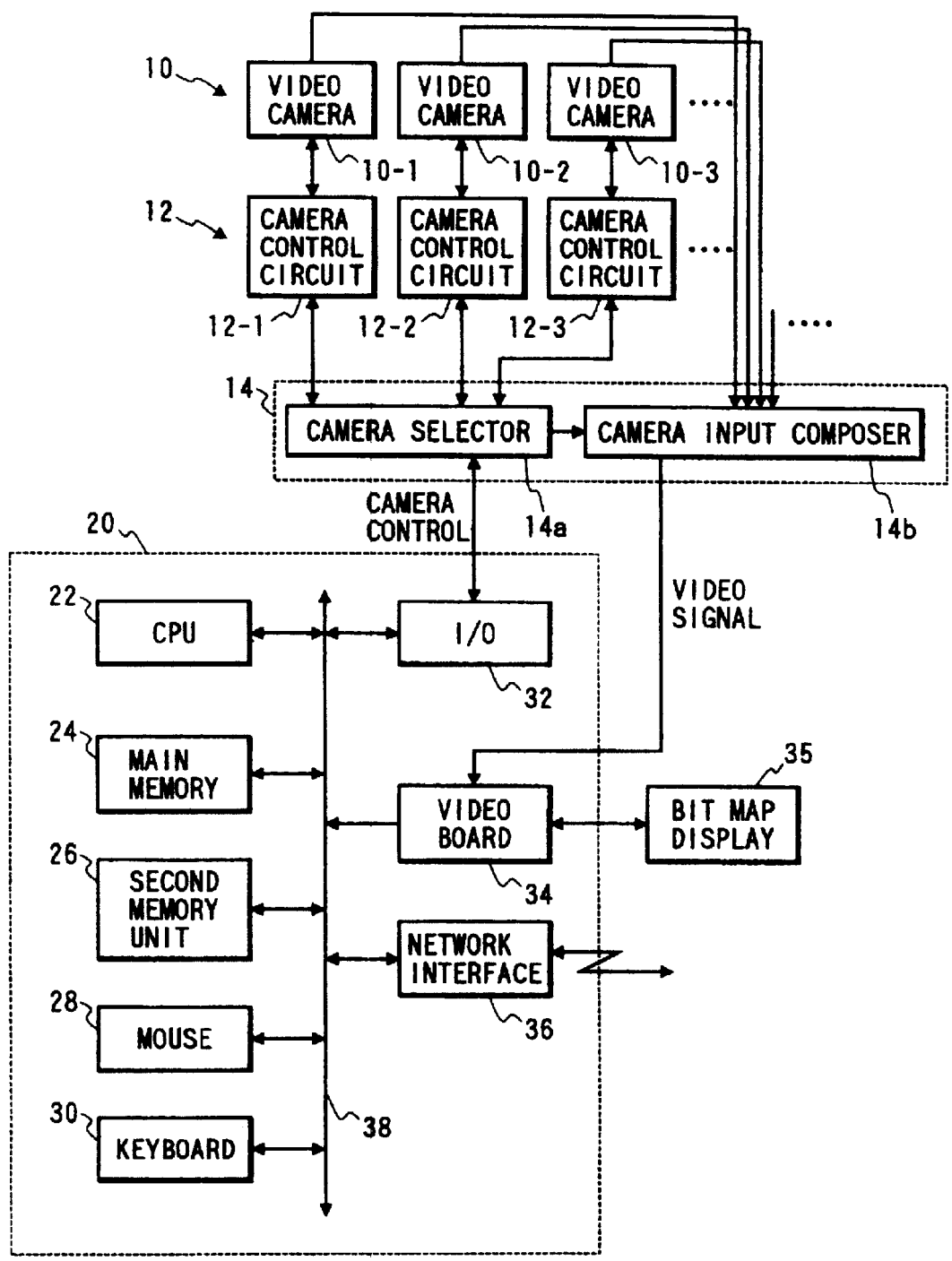
FIG. 31 is a block diagram to show a video communication terminal apparatus in which a camera input composer is included.

As shown in FIG. 31, the camera input selector 14 may include a camera selector 14A for selecting a video camera to be controlled and supplying the selected video camera with a camera control signal, and a camera input composer 14B for outputting a composite video signal from all video cameras 10-1 to 10-3 or from a plurality of selected video cameras or for outputting a video signal from one selected camera. In such a case, selecting video cameras to be controlled, and selecting video cameras from which images are inputted to the camera input composer 14B are independent of each other. To produce the composite image, there are two techniques, spatial composition in which images from a plurality of video cameras are combined on the same screen, and time-based composition in which images from a plurality of video cameras are repeatedly changed over on a time-axis. In this embodiment both techniques can be selected.

Figure 32:
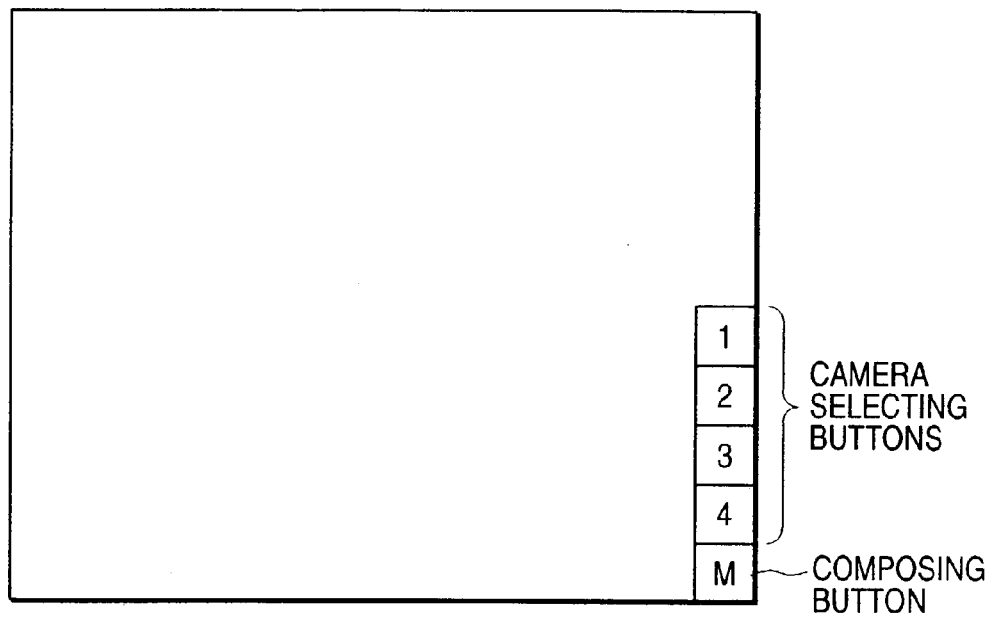
FIG. 32 is a schematic view to illustrate a screen for displaying an image from the video transmission apparatus in which the camera input composer is included and to which the plurality of cameras are connected.
Figure 33:
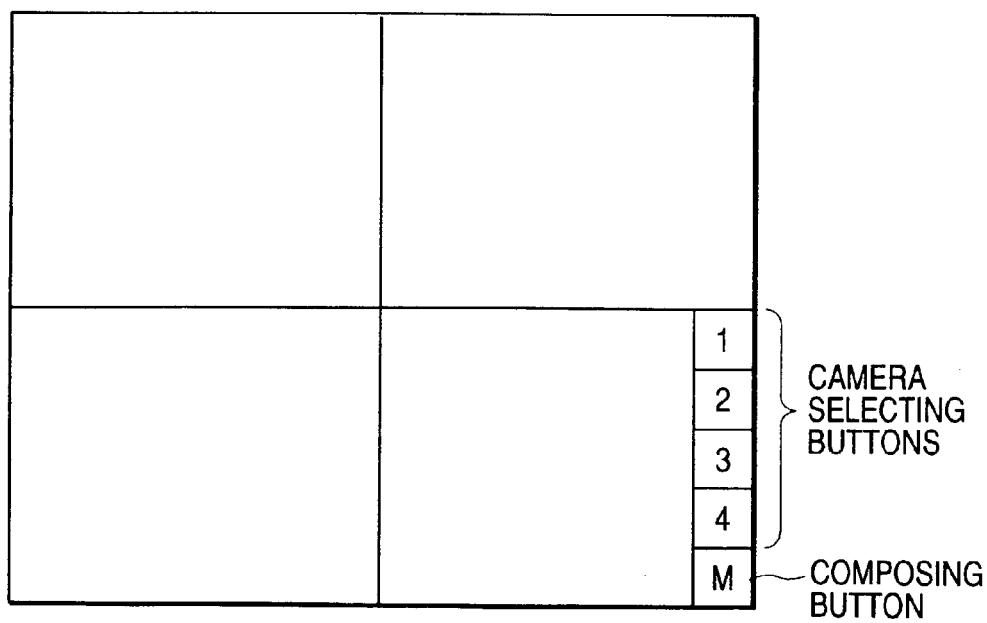
FIG. 33 is a schematic view to illustrate a screen for displaying a composite image from the video transmission apparatus in which the camera input composer is included and to which the plurality of cameras are connected.

FIGS. 32 and 33 show examples of the video display screen corresponding to the embodiment shown in FIG. 31. FIG. 32 shows a condition of the screen on which an image from a single video camera is displayed, while FIG. 33 shows a condition of the screen on which a composite image of four images from four video cameras is displayed. In each condition, camera selecting buttons and a composing button for switching over the composite image display and the single-image full-screen display are displayed in the bottom right corner of the screen.

Figure 34:
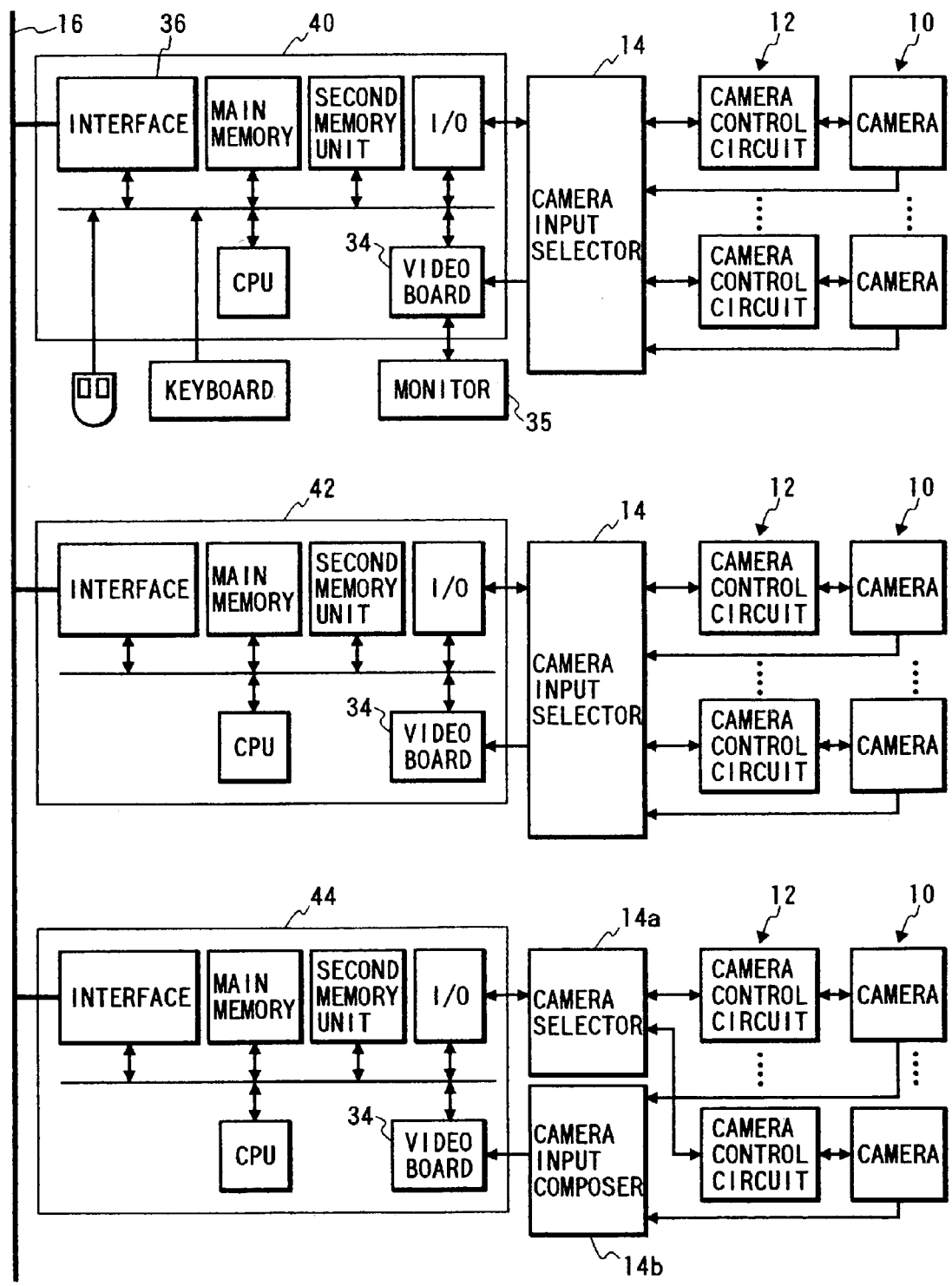
FIG. 34 is a block diagram to show the configuration of a network according to another embodiment of the present invention.

The video communication terminal apparatus shown in FIG. 29 or 31 is connected, as terminals 40, 42 and 44, to a computer network 46, as shown in FIG. 34. The terminal 40, which is a monitoring terminal operated by the user as an observer, can control video cameras connected to itself and video cameras connected to the whole terminals 42, 44 connected to the network 46. The terminal 40 also can display an image from any camera or images from any cameras. Although one monitoring terminal 40 is used in general, there is no problem if a-plurality of monitoring terminals 40 are used.

Other terminals 42 and 44 are video transmission terminals for transmitting an image or images from one camera (or from a plurality of cameras connected to the terminals) to the monitoring terminals 40. Although the terminal 42 has a structure as shown in FIG. 29 and the terminal 44 has a structure as shown in FIG. 31, it need hardly be said that the number of cameras connected to each terminal may be only one. In accordance with the number of cameras required, at least one video transmission terminal is used as the video transmission terminals 42 and 44.

As the network 46, a local area network (LAN) or wide area network (WAN) that has a sufficient transmission bandwidth for transmitting both digital moving-image data and a camera control signal may be used. Such moving-image data may be transmitted with the data compressed. Since a variety of known methods can be utilized in this embodiment, a detailed description thereof will be omitted.

Video boards 34 in the monitoring terminal 40, the video transmission terminals 42 and 44 (having the function of video capture) supply video data taken in to bit-map displays 35 to display images. A network interface 36 in the monitoring terminal 40 transmits control commands, such as a camera switching command and an image composing command, to the network 46, with the control commands converted into packets. These pieces of information are transmitted to a specified terminal in accordance with the contents of data to be transmitted and the necessity. The video transmission terminals 42 and 44 compress video data using their video boards 34 to convert it into packets, and transmit the packet-converted data to the monitoring terminal 40.

On receiving the packet-converted video data from the video transmission terminal 42 or 44, the monitoring terminal 40 expands the received data using its video board 34 to display an image on the bit-map display 35, similar to the processing of its local video signal.

Figure 35:
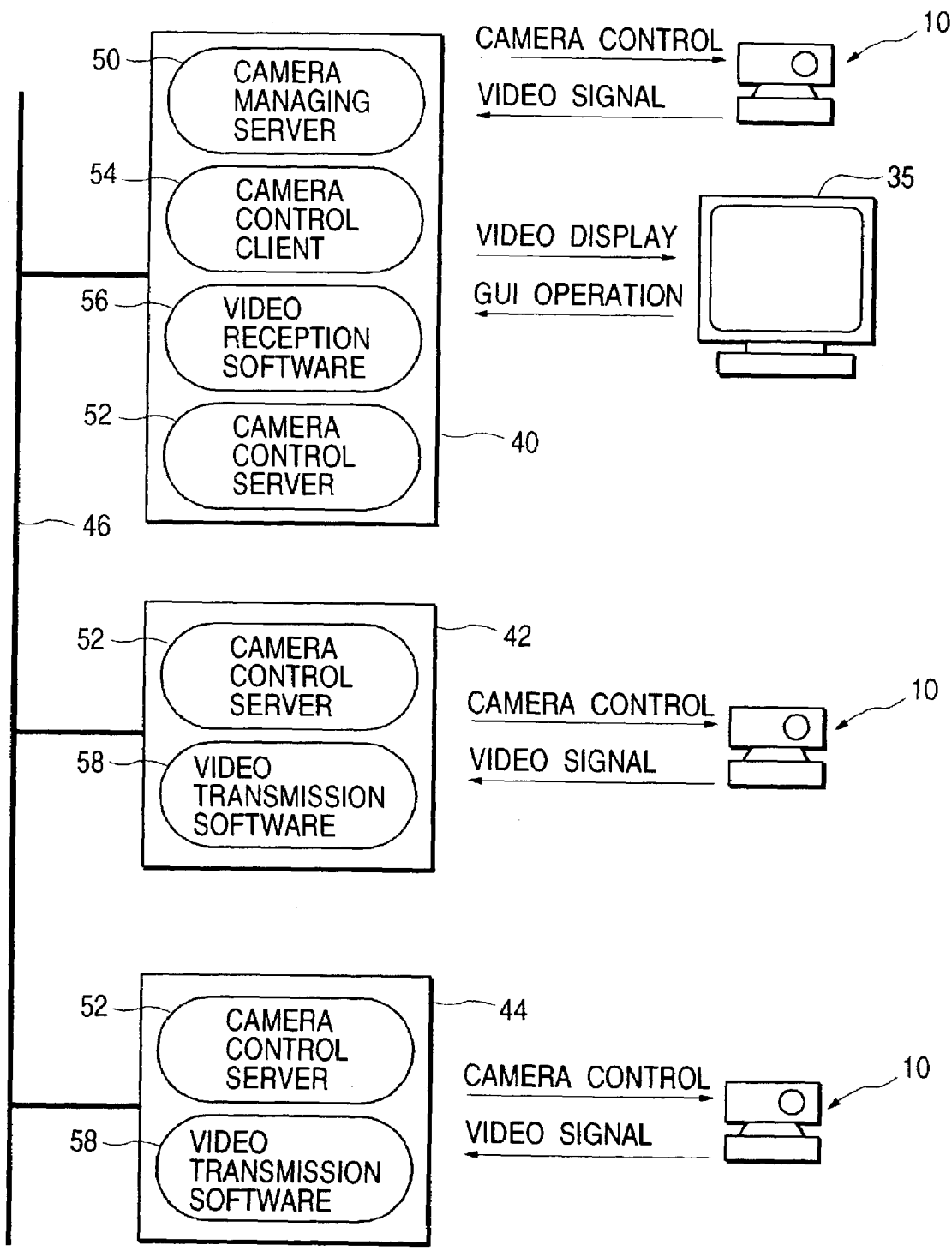
FIG. 35 is a block diagram to show the configuration of software according to the embodiment of the present invention.

FIG. 35 is a block diagram showing the configuration of software used in this embodiment. In the monitoring terminal 40, a camera managing server 50, a camera control server 52, a camera control client 54, and video reception software 56 are installed, while in the video transmission terminals 42 and 44, camera control servers 52 and video transmission software 58 are installed.

The camera managing server 50 is software to manage all the cameras, connected to the network 46, which can be utilized by the monitoring terminal 40. The camera managing server 50 holds static information related to the respective cameras, such as the names of the respective cameras, the names of hosts (the names of the terminals to which the cameras are connected), the locations at which the respective cameras are installed, whether or not the panning, tilting and zooming of the cameras can be controlled, and dynamic information representing the present condition as to whether or not the cameras are being controlled or images from the cameras are being displayed, and the names of the terminals provided with the function of video composing (for example, the camera input composer 14B). The camera managing server 50 also manages the registration of cameras which can be newly available through the network 46, the cancellation of cameras which has been separated from the network 46, and notifies the camera control client 54 of the management information of each camera, periodically or on demand.

The camera control server 52 is software to control the cameras which belong thereto, being instructed by the camera control client 54. The camera control server 52 displays the locations and directions where both the cameras connected to the monitoring terminal 40 and all the available cameras through the network 46 are installed so that predetermined corresponding camera symbols overlap with the map on the display screen of the monitoring terminal 40. The camera control client 54 also updates the form of the icon of each-camera in real time, based on camera information sent from the camera managing server 50.

The video transmission software 58 compresses an image taken in the terminal, and transmits the compressed image to a demanding terminal (normally, the monitoring terminal 40). The video reception software 56 expands the transmitted, compressed image, and displays it on the bit-map display.

Figure 36:
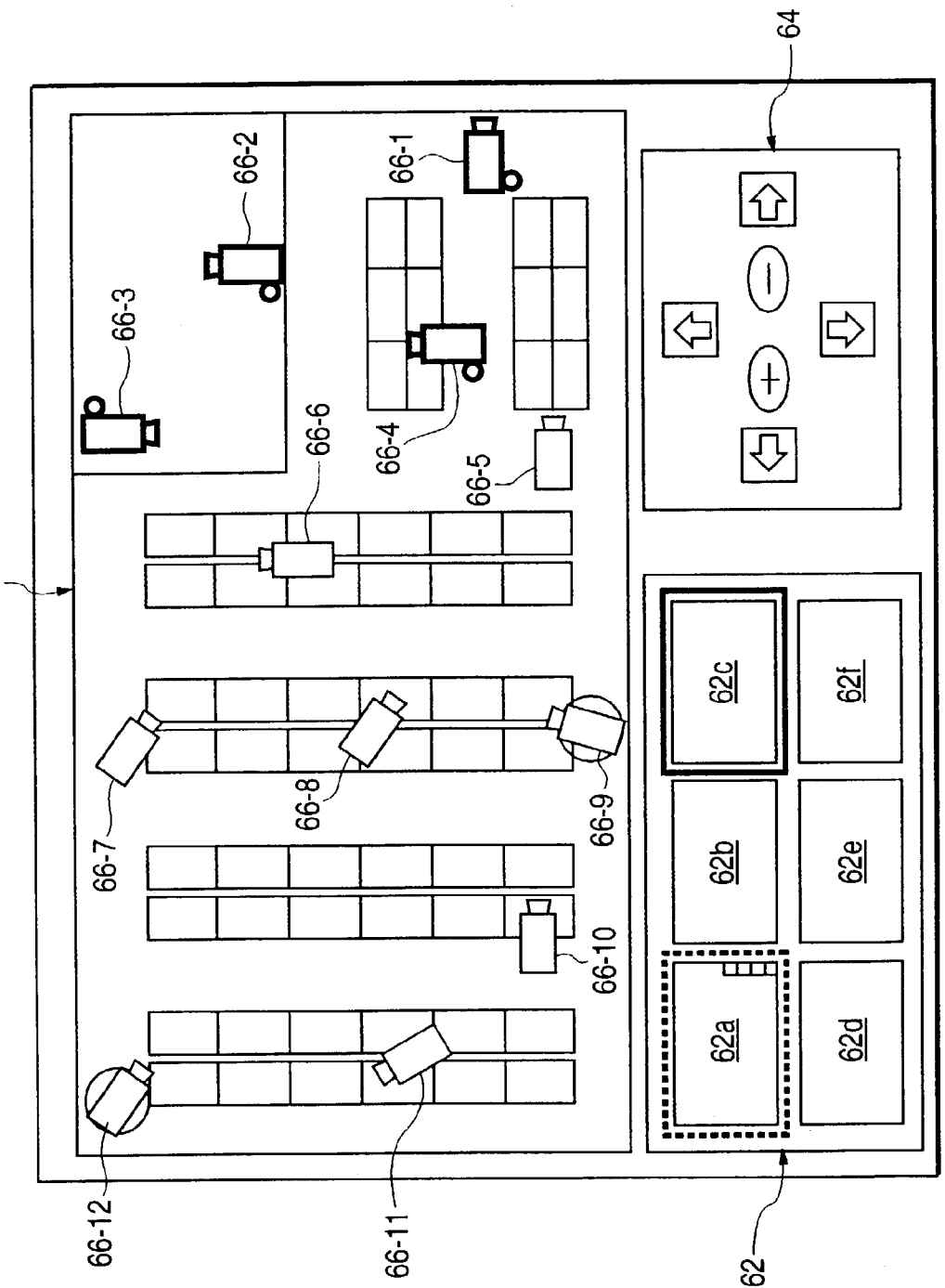
FIG. 36 is a plan view to illustrate a camera display control panel which is displayed by a monitoring apparatus according to the present invention.

FIG. 36 shows a camera display control panel that is displayed on the bit-map display 35 of the monitoring terminal 40 by the camera control client 54. A map window 60 displays camera icons which represent the locations and directions where the respective cameras are installed so that the icons overlap with a map showing the places where the cameras being controlled are installed. A camera display window 62 displays an image from one selected camera or images from a plurality of selected cameras (images from a maximum of six video transmitters), and includes six video display regions 62a, 62b, 62c, 62d, 62e and 62f. A camera operation panel 64 is provided with various camera control buttons for operating the selected cameras to pan, tilt and zoom. On the bit-map display 35 of the monitoring terminal 40, a window display system that can simultaneously display a plurality of windows operates.

Figure 37:
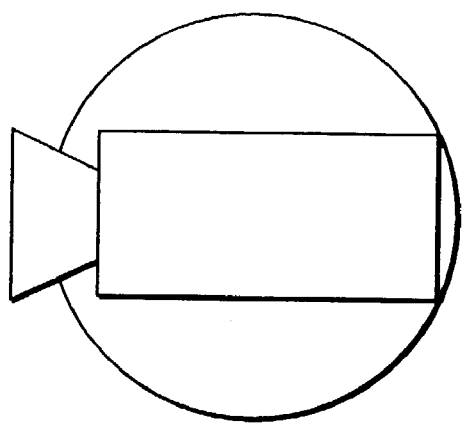
FIG. 37 is a drawing to show a camera icon representing a camera that cannot be controlled.

A map that shows the arrangement of seats in an office or store is displayed on the map window 60, and on this map the camera icons 66-1 to 66-12 which correspond to the respective locations of cameras installed in such an office or store are displayed. The respective camera icons 66-1 to 66-12 are displayed at the appropriate positions corresponding to the locations of the cameras, almost in the same directions as the cameras are actually directed. The cameras corresponding to the camera icons 66-9 and 66-12 cannot be externally controlled, which condition is represented by the form of each icon shown in FIG. 37. The camera icon corresponding to a camera from which an image is being displayed on the video display window 62 is displayed by the camera control client 54 so that the frame of the icon is yellow.

The operation of the camera display control panel shown in FIG. 36 and how the panel is used will be described below. By selecting one icon from the camera icons 66-1 to 66-12 on the map window 60 (for example, by clicking the icon 66-1 with a mouse), the camera corresponding to the selected icon is regarded as selected, and the frame color of the icon 66-1 is changed to yellowish green by the camera control client 54. The camera control client 54 queries the camera managing server 50 about information related to the camera corresponding to the selected camera icon 66-1. The camera managing server 50 makes reference to the name of the camera queried, and confirms whether or not another camera connected to the same host (video transmission terminal apparatus 20) is used. In other words, the camera managing server 50 looks up whether or not another camera connected to the camera input selector 14 for the same host to which the selected camera is connected is used, and notifies the camera control client 54 of the result. The camera managing server 50 simultaneously confirms whether or not the host corresponding to the selected camera is provided with the camera input composer 14B. If the host is provided with the camera input composer 14B, the camera managing server 50 notifies the camera control client 54 of its presence.

Figure 38:
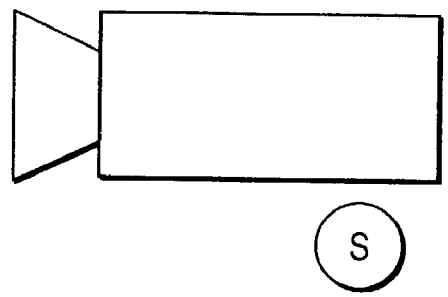
FIG. 38 is a drawing to show a camera icon representing a plurality of cameras connected to the same host.
Figure 39:
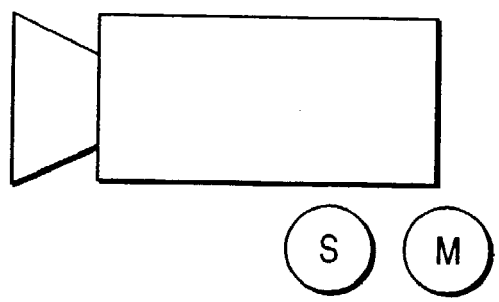
FIG. 39 is a drawing to show a camera icon representing a camera connected to the camera input composer.

The camera control client 54 changes each form of the camera icons corresponding to all the cameras connected to the same host to which the early selected camera is connected, into a form shown in FIG. 38 when the host is not provided with the camera input composer 14B. The camera control client 54 changes each form into a form shown in FIG. 39 when the host is provided with the camera input composer 14B. The frames of the camera icons in both cases are changed to be yellowish green. While the image from the camera corresponding to the icon 66-1 is being displayed in one of the video display regions 62a to 62f of the video display window 62, the camera control client 54 also changes the frame color of the'video display region to yellowish green.

For example, when the cameras corresponding to the camera icons 66-1, 66-2, 66-3 and 66-4 are connected to the same host which is not provided with the camera input composer 14B, the camera control client 54 changes each form of the camera icons 66-1, 66-2, 66-3 and 66-4 into the form shown in FIG. 38, which form has been already shown in FIG. 36, and displays the frames of the changed camera icons in yellowish green. While the image from the camera corresponding to the selected camera icon 66-1 is being displayed in the video display region 62a of the video display window 62, the camera control client 54 displays the frame surrounding the video display region 62a in yellowish green, as shown in FIG. 36.

Figure 40:
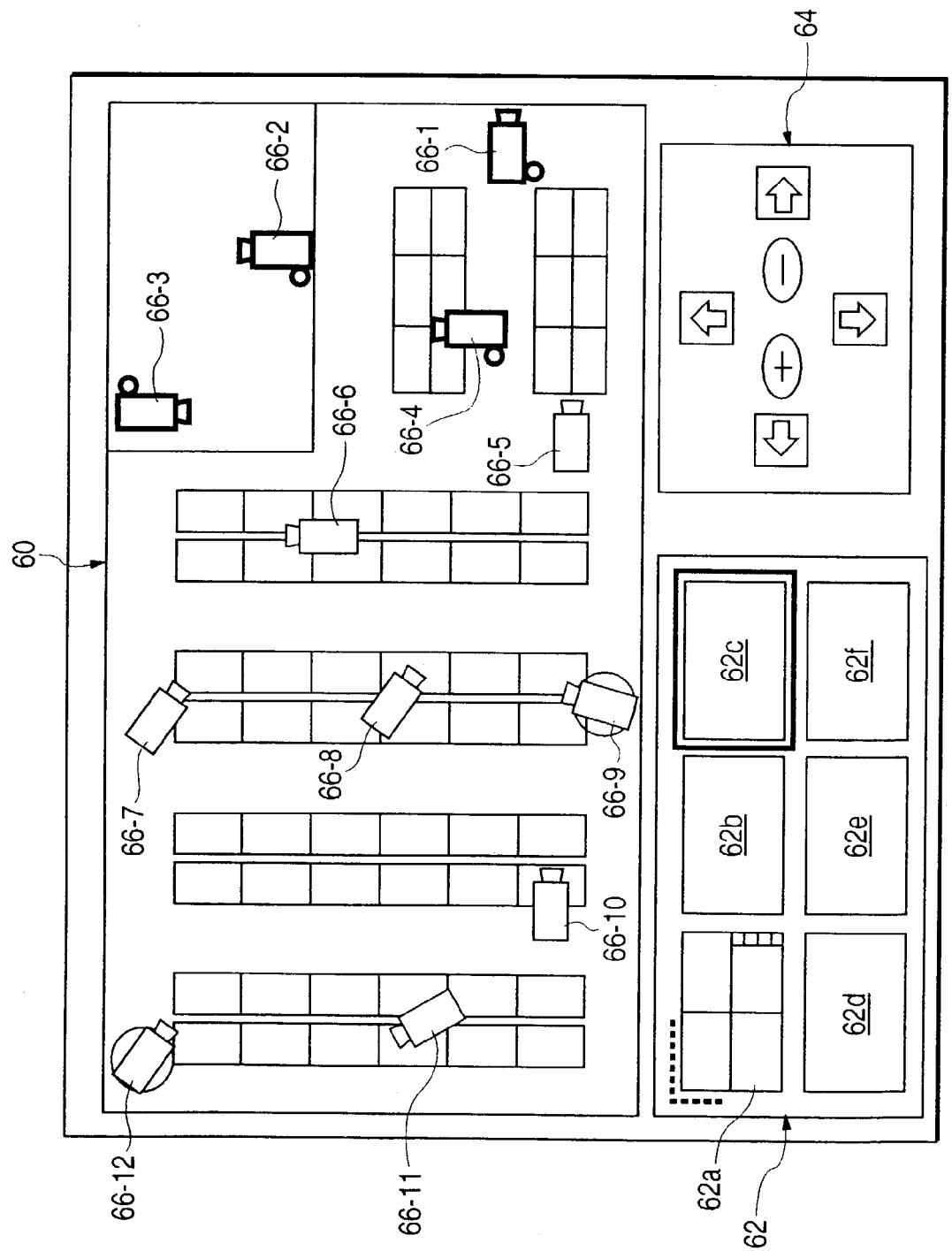
FIG. 40 is a plan view to illustrate a camera display control panel, including a composite image, which panel is displayed by the monitoring apparatus.

FIG. 40 shows an example of the screen obtained when the camera corresponding to the selected camera icon (in this case the icon 66-1) is connected to the host provided with the camera input composer 14B. The camera control client 54 changes each form of the camera icons 66-1, 66-2, 66-3 and 66-4 into the form shown in FIG. 39, and displays the changed icon frame in yellowish green. As shown in FIG. 40, the composite image of images from four cameras connected to the host to which the camera corresponding to the camera icon 66-1 is connected is displayed in the video display region 62a of the video display window 62. Camera selecting buttons and composing buttons (as shown in FIGS. 32 and 33) are displayed in the bottom right corner of the video display region 62a. In accordance with the selection of the camera icon 66-1, the camera control client 54 displays an L-shaped yellowish green frame along the periphery of a portion of the video display region 62a, in which portion the image from the camera corresponding the camera icon 66-1 is displayed. An enlarged view of the portion of the video display region 62a is shown in FIG. 41.

Such displayed camera icons on the map enable the observer to easily grasp which cameras are connected to the same host to which the selected camera is connected. In addition, when the host is provided with the camera input composer, the display conditions of the camera icons are different, thus, the observer can easily grasp both a type of cameras by which a composite image of reduced images can be displayed and another type of camera by which a composite image of reduced images cannot be displayed.

In order to select a camera from which an image needs to be displayed on the video display window 62, the camera icon corresponding to this camera may be dragged and dropped on the video display window 62. For example, when the selected camera is represented by the camera icon 66-2, the camera control client 54 queries the camera managing server 50 about whether or not an image from a camera connected to the same host to which the camera represented by the icon 66-2 is being displayed.

If an image from a camera connected to the same host is being displayed, for example, while the image from the camera represented by the camera icon 66-1 is being displayed, the camera control client 54 sends the host a camera switching command for switching the camera to the camera represented by the camera icon 662 so that the host transmits the image from the camera represented by the camera icon 66-2, and then displays the transmitted image from the camera represented by the camera icon 66-2 in the video display region (for example, 62a) where the image from the camera represented by the camera icon 66-1 is displayed.

While the image from the camera connected to the same host is not being displayed, the camera control client 54 displays the image from the camera corresponding to the camera icon 66-2 in the display region where no image is displayed. At this time, the camera control client 54 looks up the host that is provided with the camera corresponding to the camera icon 66-2, and if another camera connected to the same host is detected, camera selecting buttons are displayed in the video display region in which the image from the camera corresponding to the camera icon 66-2 are displayed, as shown in FIG. 30.

When an image is further displayed among the video display regions 62a to 62f of the video display window 62, or when a camera from which an image is being displayed has been switched to another camera, the camera control managing server 50 updates the list of the names of the cameras from which images are being displayed, and the camera control client 54 changes the frames of camera icons corresponding to camera names included in the camera name list to be yellow.

By selecting one image from the images displayed in the video display regions 62a to 62f of the video display window 62 (for example, by clicking with the mouse), or by double clicking any camera icon on the map window 60, the camera operation panel 64 is displayed. With respect to each of the video display regions 62a to 62f for displaying an image from the camera corresponding to the activated camera operation panel, a red frame surrounding the region is displayed to represent a camera control condition. The color of the camera icon corresponding to the camera being controlled is also changed to red.

In the foregoing embodiments the display forms of the camera icons are changed in accordance with whether or not the cameras are controlled, whether or not the cameras are connected to the same host (video communication terminal apparatus 20), and whether or not the cameras are connected to the same camera input composer. However, for example, the brightness of the camera icons corresponding to cameras which cannot be controlled may be changed such that the colors of the camera icons are darkened, or the display colors of the camera icons are differentiated. Similarly, although the camera icons corresponding to cameras from which images are displayed are discriminated based on their frame colors, the forms of the camera icons may be changed. The camera icons may be modified by combining colors and forms so that the observer can easily discriminate the icons.

Further, it is obvious that the present invention may be applied to a system formed by a plurality of apparatuses or an apparatus formed by a single unit. In addition, the present invention may be applied by providing a system or apparatus with software. In such a case a storage medium in which software for using the present invention is stored is a main component of the present invention. The system or apparatus operates in a predetermined manner by the software read from the storage medium thereto.

As easily understood from the foregoing description, in accordance with the above embodiments, the camera icons displayed on the map enable the observer to easily grasp the relationship between the cameras represented by the camera icons and the images being displayed on the video display screen.

In addition, the cameras which can be externally controlled to pan, tilt and zoom, and the cameras which cannot be externally controlled are discriminated by using the camera icons.

Further, the camera icons on the map enable the observer to recognize which camera is connected to the same video transmission apparatus to which the selected camera is connected, and to recognize which cameras are connected to the same camera input composer. Accordingly, the operability of the system is extremely improved.

As described above, in accordance with the above embodiments, camera information can be displayed by using the camera icons on the map so that the observer can easily understand the information.

The invention claimed is:

1. An image processing apparatus comprising:

video signal supplying means for supplying a video signal to a monitor so as to display, on the monitor, at least one symbol representing an image signal generating means, and a window for displaying an image signal from the image signal generating means;

display control means for effecting display control in accordance with an operation made on the symbol displayed on the monitor; and control means for controlling the video signal supplying means in accordance with a drag and drop of the symbol to the window on the monitor, to start displaying the image signal from the image signal generating means represented by the symbol, in the window on the monitor.

2. An image processing apparatus according to claim 1, wherein the window is divided into a plurality of areas in advance, and displays the image signal from the image signal generating means represented by the symbol moved into an area by the drop operation.

3. An image processing apparatus according to claim 1, further comprising display means for generating information indicating a generation condition of the image signal from the image signal generating means represented by the symbol, and displaying the information on a display.

4. A control method for an image processing apparatus, comprising:

a video signal supplying step of supplying a video signal to a monitor so as to display, on the monitor, at least one a symbol representing an image signal generating method, and a window for displaying an image signal generated by the image signal generating method;

a display control step of effecting display control in accordance with an operation made on the symbol displayed on the monitor; and a control step of controlling the video signal supplying step in accordance with a drag and drop of the symbol to the window on the monitor to start displaying the image signal generated by the image signal generating method represented by the symbol, in the window on the monitor.

5. A control method according to claim 4, wherein the window is divided into a plurality of areas in advance, and displays the image signal generated by the image signal generating method represented by the symbol moved into an area by the drop operation.

6. A control method according to claim 4, further comprising a display step of generating information indicating a generation condition of the image signal generated by the image signal generating method represented by the symbol, and displaying the information on a display.

7. A computer program stored on a computer-readable medium and embodying a computer-executable program for implementing the control method according to claim 4.

8. A computer program stored on a computer-readable medium and embodying a computer-executable program for implementing the control method according to claim 5.

9. A computer program stored on a computer-readable medium and embodying a computer-executable program for implementing the control method according to claim 6.

10. An image processing apparatus comprising:

a processor programmed to supply a video signal to a monitor so as to display, on the monitor, at least one a symbol representing an image signal generating means, and a window for displaying an image signal from the at least one image signal generating means;

a processor programmed to effect display control in accordance with an operation made on the symbol displayed on the monitor; and a processor programmed to control the video signal supply processor in accordance with a drag and drop of the symbol to the window on the monitor start displaying the image signal from the image signal generating means represented by the symbol, in the window on the monitor.

11. An image processing apparatus according to claim 10, wherein the window is divided into a plurality of areas in advance, and displays the image signal from the image signal generating means represented by the symbol moved into an area by the drop operation.

12. An image processing apparatus according to claim 10, further comprising a processor programmed to generate information indicating a generation condition of the image signal from the image signal generating means represented by the symbol, and display the information on a display.

* * * * *